US008453328B2

(12) United States Patent
Kats et al.

(10) Patent No.: US 8,453,328 B2
(45) Date of Patent: Jun. 4, 2013

(54) METHODS AND DEVICES FOR ASSEMBLING A TERRESTRIAL SOLAR TRACKING PHOTOVOLTAIC ARRAY

(75) Inventors: Mikhail Kats, Rockaway, NJ (US); Gary D. Hering, Belle Mead, NJ (US)

(73) Assignee: Suncore Photovoltaics, Inc., Irwindale, CA (US)

( * ) Notice: Subject to any disclaimer, the term of this patent is extended or adjusted under 35 U.S.C. 154(b) by 428 days.

(21) Appl. No.: 12/791,580

(22) Filed: Jun. 1, 2010

(65) Prior Publication Data

US 2011/0289750 A1 Dec. 1, 2011

(51) Int. Cl.
*B23P 6/00* (2006.01)

(52) U.S. Cl.
USPC .......................... 29/890.033; 29/464; 29/467

(58) Field of Classification Search
USPC ..................................... 29/890.033, 464, 467
See application file for complete search history.

(56) References Cited

U.S. PATENT DOCUMENTS

| | | |
|---|---|---|
| 4,031,385 A | 6/1977 | Zerlaut et al. |
| 4,133,501 A | 1/1979 | Pentlicki |
| 4,172,739 A | 10/1979 | Tassen |
| 4,345,582 A | 8/1982 | Aharon |
| 4,425,904 A | 1/1984 | Butler |
| 4,440,465 A | 4/1984 | Elliot et al. |
| 4,585,318 A | 4/1986 | Seifert |
| 4,586,488 A | 5/1986 | Noto |
| 4,628,142 A | 12/1986 | Hashizume |
| 4,832,001 A | 5/1989 | Baer |
| 4,888,340 A | 12/1989 | Neh et al. |

(Continued)

FOREIGN PATENT DOCUMENTS

| | | |
|---|---|---|
| DE | 10 2004 018151 A1 | 10/2005 |
| DE | 20 2006 003476 U1 | 12/2006 |
| ES | 2268938 A1 | 3/2007 |
| JP | 2000196127 | 7/2000 |
| JP | 2000223730 | 8/2000 |
| JP | 2002202817 | 7/2002 |
| WO | WO 01/55651 A1 | 8/2001 |

(Continued)

OTHER PUBLICATIONS

U.S. Appl. No. 12/791,580, filed Jun. 1, 2010, Kats et al.

(Continued)

*Primary Examiner* — Alexander P Taousakis
(74) *Attorney, Agent, or Firm* — Mueting, Raasch & Gebhardt, P.A.

(57) ABSTRACT

Methods and devices for assembling a terrestrial solar tracking photovoltaic array. The methods may include securing a torque tube to an alignment fixture by positioning a flange at an end of the torque tube over a shelf on the alignment fixture and positioning a section of the torque tube inward from the flange into a receptacle on the shelf of the alignment fixture. The method may include aligning and mounting a mount to the torque tube at a point along the torque tube inward from the end of the torque tube. The method may include aligning and mounting a solar cell module to the mount with the solar cell module including an array of lenses positioned over a set of corresponding receivers that include one or more III-V compound semiconductor solar cells. The method may include removing the torque tube from the alignment fixture after the solar cell module is mounted to the mount. The method may include aligning and mounting the torque tube to an end of a longitudinal support with the torque tube being coaxial with the longitudinal support and the solar cell module being able to rotate with the torque tube about a first axis that extends through the torque tube and the longitudinal support and a second axis perpendicular to the first axis.

20 Claims, 19 Drawing Sheets

U.S. PATENT DOCUMENTS

| | | | |
|---|---|---|---|
| 4,989,124 | A | 1/1991 | Shappell |
| 4,995,377 | A | 2/1991 | Eiden |
| 5,169,456 | A | 12/1992 | Johnson |
| 5,600,124 | A | 2/1997 | Berger |
| 5,798,517 | A | 8/1998 | Berger |
| 6,005,236 | A | 12/1999 | Phelan et al. |
| 6,058,930 | A | 5/2000 | Shingleton |
| 6,079,408 | A | 6/2000 | Fukada |
| 6,123,067 | A | 9/2000 | Warrick |
| 6,465,725 | B1 | 10/2002 | Shibata et al. |
| 6,552,257 | B1 | 4/2003 | Hart et al. |
| 6,563,040 | B2 | 5/2003 | Hayden et al. |
| 6,722,357 | B2 | 4/2004 | Shingleton |
| 6,960,717 | B2 | 11/2005 | Stuart et al. |
| 7,252,084 | B2 | 8/2007 | Pawlenko et al. |
| 7,381,886 | B1 | 6/2008 | Aiken et al. |
| 7,531,741 | B1 | 5/2009 | Melton et al. |
| 7,795,568 | B2 | 9/2010 | Sherman |
| 7,836,879 | B2 | 11/2010 | Mackamul |
| 2003/0172922 | A1 | 9/2003 | Haber |
| 2004/0112373 | A1 | 6/2004 | Djeu |
| 2007/0089777 | A1 | 4/2007 | Johnson, Jr. et al. |
| 2007/0101738 | A1 | 5/2007 | Akei et al. |
| 2007/0188876 | A1 | 8/2007 | Hines et al. |
| 2007/0193620 | A1 | 8/2007 | Hines et al. |
| 2008/0029151 | A1 | 2/2008 | McGlynn et al. |
| 2008/0128586 | A1 | 6/2008 | Johnson et al. |
| 2008/0135087 | A1 | 6/2008 | Anikara |
| 2008/0178867 | A1 | 7/2008 | DiDomenico |
| 2008/0236567 | A1 | 10/2008 | Hayden |
| 2008/0258051 | A1 | 10/2008 | Heredia et al. |
| 2009/0000662 | A1 | 1/2009 | Harwood et al. |
| 2009/0032014 | A1 | 2/2009 | Meydbray |
| 2009/0032084 | A1 | 2/2009 | Aiken et al. |
| 2009/0032086 | A1 | 2/2009 | Kats et al. |
| 2009/0032090 | A1 | 2/2009 | Kats et al. |
| 2009/0199890 | A1 | 8/2009 | Hering et al. |
| 2010/0011565 | A1 | 1/2010 | Zawadzki et al. |
| 2010/0018570 | A1 | 1/2010 | Cashion et al. |
| 2010/0032004 | A1 | 2/2010 | Baker et al. |
| 2010/0101625 | A1 | 4/2010 | Kats et al. |
| 2010/0101630 | A1 | 4/2010 | Kats et al. |
| 2010/0101632 | A1 | 4/2010 | Kats et al. |
| 2010/0102200 | A1 | 4/2010 | Kats et al. |
| 2010/0102202 | A1 | 4/2010 | Sherman |
| 2010/0108860 | A1 | 5/2010 | Sherman et al. |
| 2010/0258110 | A1 | 10/2010 | Krabbe et al. |
| 2010/0294337 | A1 | 11/2010 | Sherman et al. |
| 2012/0160991 | A1* | 6/2012 | Kats et al. ............ 250/203.4 |

FOREIGN PATENT DOCUMENTS

| | | |
|---|---|---|
| WO | WO 02079793 | 10/2002 |
| WO | WO 2008/008023 A1 | 1/2008 |
| WO | WO 2008/090241 A1 | 7/2008 |
| WO | WO 2008/154945 | 12/2008 |
| WO | WO 2009/048879 | 4/2009 |

OTHER PUBLICATIONS

U.S. Appl. No. 12/828,734, filed Jul. 1, 2010, Kozin.

U.S. Appl. No. 12/830,926, filed Jul. 6, 2010, Sherman.

Fraas, L., et al., "Start-Up of First 100 kW System in Shanghai with 3-Sun PV Mirror Modules." 4 pages. Presented at 4th International Conference on Solar Concentrators for the Generation of Electricity or Hydrogen (ICSC-4), San Lorenzo del Escorial, Spain, Mar. 12-16, 2007. Jxcrystals.com. JX Crystals, Inc., Issaquah, WA.

Fraas, L., et al., "Test Sites and Testing of 3-Sun Mirror Modules." 4 pages. Presented at IEEE 4th World Conference on Photovoltaic Energy Conversion, Waikoloa, Hawaii, May 9, 2006. Jxcrystals.com. JX Crystals, Inc., Issaquah, WA.

"Laser welding of plastics. Innovative and flexible." Brochure. http://www.leister.com/uploads/pdf/en/leister_laser_eng.pdf. Sep. 2007. Leister Process Technologies. Kaegiswil, Switzerland. (12 pages).

"GLOBO-welding. Laser welding of plastics—innovative and flexible. The universal processing concept for 3D and continuous applications." Brochure. http://www.leister.com/uploads/pdf/en/BRO_GLOBO_Welding_dv092006_ENG.pdf. Sep. 2006. Leister Process Technologies. Kaegiswil, Switzerland. (4 pages).

"OPEL TF-800 Single Axis Tracker" datasheet. OPEL Solar™ Inc., www.opelinc.com, Shelton, CT, Nov. 2009; 2 pgs.

Photograph of GE Concentrator Array, Circa 1983, Sandia; 1 page.

"Power-Spar PS-140 Solar Concentrator," datasheet. Menova Energy, Inc., Markham, Ontario, Canada, 2009 (metadata indicates that the datasheet was created Jan. 19, 2009); 2 pgs.

"SF-40 H1 Rooftop Tracker" datasheet. OPEL Solar™ Inc., www.opelinc.com, Shelton, CT, Nov. 2009 ; 2 pgs.

"Shop SABRE, a N.A.S.C.I. Company, 'The Way CNC Was Meant to Be'" Laser Product Information datasheet. Shop SABRE, Elko, MN, USA, 2007, available online [earliest known availability: Jun. 13, 2007; retrieved on Jun. 26, 2008]. Retrieved from the Internet:<URL:http://www.shopsabre.com/Laser%20Page.html>; 4 pgs.

"Slewing Drives S7b-73m-32ra," datasheet [online]. Kinematics Manufacturing, Inc., Phoenix, AZ, 2009, available online [earliest known availability: Mar. 8, 2009; retrieved on Jul. 8, 2009]. Retrieved from the Internet:<URL:www.kinematicsmfg.com/Products/slewing-drives/SlewingDrivesProducts/Slewing-Drives-S7B-73M-32RA.aspx>; 2 pgs.

"SunCube™ Specifications" datasheet. Green & Gold Energy Pty, Ltd., Glynde, South Australia, Australia, Sep. 3, 2009; 4 pgs.

"Sunflower" datasheet. Energy Innovations, Poway, CA, copyright 2003-2010; 2 pgs.

"TF-500 Dual Axis Tracker" datasheet. OPEL Solar™ Inc., www.opelinc.com, Shelton, CT, Nov. 2009; 2 pgs.

"WS T1000" datasheet [online]. WS Energia Lda, Oeiras, Portugal, earliest known availability Oct. 20, 2010, available online. Retrieved from the Internet<URL: http://www.ws-energia.com/np4EN/trackers>; 2 pgs.

"WS T 1600—the world wide connected solar tracker" datasheet [online] WS Energia Lda, Oeiras, Portugal, earliest known availability Oct. 20, 2010, available online. Retrieved from the Internet<URL: http://www.ws-energia.com/np4EN/trackers>; 3 pgs.

"WS T 1600—the world wide connected solar tracker" datasheet [online] WS Energia Lda, Oeiras, Portugal, earliest known availability Oct. 20, 2010, available online. Retrieved from the Internet<URL: http://www.ws-energia.com/np4EN/trackers>; 2 pgs.

"170 Watt Multi-Purpose Module NEC 2008 Compliant, NE-170UC1" datasheet. Sharp Electronics Corporation, Huntington, CA, 2008 (metadata indicates that the datasheet was created Jul. 12, 2008); 2 pgs.

"Concentrating PV module and system developers[#5]" PHOTON International: The Photovoltaic Magazine, photon Europe GmbH, Germany, Aug. 2009; pp. 134-137.

"FEiNA SF-4 Mini Tracker" datasheet. OPEL Solar™ Inc., www.opelinc.com, Shelton, CT, Nov. 2009; 2 pgs.

"FEiNA SF-9 Dual Axis Tracker" datasheet. OPEL Solar™ Inc., www.opelinc.com, Shelton, CT, Nov. 2009; 2 pgs.

"FEiNA SF-20 Dual Axis Tracker" datasheet. OPEL Solar™ Inc., www.opelinc.com, Shelton, CT, Nov. 2009; 2 pgs.

"Kinematics slewing drives," Product description datasheet [online]. Kinematics Manufacturing, Inc., Phoenix, AZ, 2009, available online [retrieved on Jul. 8, 2009]. Retrieved from the Internet:<URL: www.kinematicsmfg.com/Products/slewing-drives.aspx>; 1 page.

Luque et al., Ed. Sections 9.8 and 9.9 "High-Efficiency III-V Multijunction Solar Cells," and Chapter 11 "Photovoltaic Concentrators," *Handbook of Photovoltaic Science and Engineering*, John Wiley & Sons, Ltd., Hoboken, NJ, Jul. 7, 2003; 64 pgs. ISBN1591247748.

"Mk-ID High Concentration Photovoltaic Panel (HCPV)" datasheet. OPEL Solar™ Inc., www.opelinc.com, Shelton, CT, Nov. 2000; 2 pgs.

"OPEL SF-4M Roof Top Tracker" datasheet. OPEL Solar™ Inc., www.opelinc.com, Shelton, CT, Nov. 2009; 2 pgs.

"OPEL SF-20 CPV Dual Axis Tracker" datasheet. OPEL Solar™ Inc., www.opelinc.com, Shelton, CT, Nov. 2009; 2 pgs.

* cited by examiner

METHODS AND DEVICES FOR ASSEMBLING A TERRESTRIAL SOLAR TRACKING PHOTOVOLTAIC ARRAY

RELATED APPLICATIONS

The present application is related to U.S. patent application Ser. No. 12/623,134 filed on Nov. 20, 2009.

The present application is related to U.S. patent application Ser. No. 12/574,508 filed Oct. 6, 2009.

The present application is related to U.S. patent application Ser. No. 12/478,567 filed Jun. 4, 2009.

The present application is related to U.S. patent application Ser. No. 12/257,670 filed Oct. 24, 2008.

BACKGROUND

The present application is directed to a solar tracking photovoltaic array and, more particularly, to an alignment device and methods for assembling and aligning individual components of a solar array.

Solar tracking photovoltaic arrays are used for various applications. The arrays are designed for a specific output capacity that may vary from being relatively small, such as a few kilowatts, to relatively large in excess of hundreds of kilowatts. The arrays may be installed at various locations that have exposure to the sun for adequate periods of time to produce the required power capacity.

The arrays generally include a frame with one or more solar cell modules in the form of panels. The frame may be adjustable to position the solar cell modules towards the sun. The frame may adjust the position of the solar cell modules throughout the day and throughout the year to ensure they remain directed to the sun to maximize the power capacity.

The arrays are often large assemblies that may be difficult or even impossible to transport once they are assembled. Because of this, it may be advantageous to assemble the arrays in the field at an installation site. Assembly of the solar arrays in the field may provide for the arrays to be packaged and transported as kits to facilitate transport and assembly. Further, the assembly at the installation site may provide for less-skilled workers to perform the assembly process, and the assembly may be done quickly.

SUMMARY

The present application is directed to methods and devices for assembling a terrestrial solar tracking photovoltaic array. According to some embodiments of the present invention, the method includes positioning a torque tube on two vertical supporting alignment fixtures. The method may include mounting a mount to the torque tube between first and second ends of the torque tube with the mount having first and second sections that extend outward from opposing sides of the torque tube. The method may include mounting a first solar cell module to the first section of the mount and a second solar cell module to the second section of the mount. Each of the solar cell modules may include an array of lenses positioned over a set of corresponding receivers that include one or more III-V compound semiconductor solar cells. The method may include removing the torque tube from the alignment fixtures after the solar cell modules are mounted to the mount. The method may include aligning the torque tube with a longitudinal support mounted over the surface of the earth with the torque tube and the longitudinal support being coaxial and aligned in an end-to-end orientation. The method may include attaching the torque tube to the end of the longitudinal support with the first and second solar cell modules being rotatable about a first axis defined by the coaxial torque tube and the longitudinal support and a second axis substantially perpendicular to the first axis.

Some embodiments of the present invention may be directed to a method of assembling a terrestrial solar tracking photovoltaic array that may include securing a torque tube to an alignment fixture by positioning a flange at an end of the torque tube over a shelf on the alignment fixture and positioning a section of the torque tube inward from the flange into a receptacle on the shelf of the alignment fixture. The method may include aligning and mounting a mount to the torque tube at a point along the torque tube inward from the end of the torque tube. The method may include aligning and mounting a solar cell module to the mount with the solar cell module including an array of lenses positioned over a set of corresponding receivers that include one or more III-V compound semiconductor solar cells. The method may include removing the torque tube from the alignment fixture after the solar cell module is mounted to the mount. The method may include aligning and mounting the torque tube to an end of a longitudinal support with the torque tube being coaxial with the longitudinal support and the solar cell module being able to rotate with the torque tube about a first axis that extends through the torque tube and the longitudinal support and a second axis perpendicular to the first axis.

Some embodiments of the present invention may include a method of assembling a terrestrial solar tracking photovoltaic array. The method may include securing a first torque tube section to first and second alignment fixtures. While the first torque tube section is secured, the method may include mounting a first mount to the first torque tube section and a first linkage to the first mount. The method may include removing the first torque tube section from the first and second alignment fixtures. Thereafter, the method may include securing a second torque tube section to the first and second alignment fixtures. While the second torque tube section is secured, the method may include mounting a second mount to the second torque tube section and a second linkage to the second mount. The method may include removing the second torque tube section from the first and second alignment fixtures. The method may include rotatably securing the first torque tube section on a first plurality of vertical supports and rotatably securing the second torque tube section on a second plurality of vertical supports. The method may include aligning and mounting the second torque tube section to an end of the first torque tube section with the sections being arranged in coaxial end-to-end arrangement. The method may include attaching the first and second linkages together. The method may include attaching solar cell modules to each of the first and second mounts with the solar cell modules including an array of lenses positioned over a set of corresponding receivers that include one or more III-V compound semiconductor solar cells. The method may include attaching the first torque tube section to a first drive to rotate the first and second torque tube sections about a first axis that extends through the first and second torque tube sections. The method may include attaching one of the first and second linkages to a linear actuator to rotate the first and second mounts about a second axis perpendicular to the first axis.

Some implementations or embodiments may incorporate or implement fewer of the aspects or features noted in the foregoing embodiments.

DETAILED DESCRIPTION

The present application is directed to methods and devices for assembling a modular terrestrial solar tracking photovoltaic array (hereinafter solar array). The solar array includes a number of discrete sections that each includes a longitudinal torque tube and one or more solar cell modules. The devices and methods provide for individually assembling each discrete section. The finished discrete sections are then connected together to form the overall solar array. The number and sizes of the discrete sections may vary depending upon the desired electrical output of the solar array.

Figure 1:
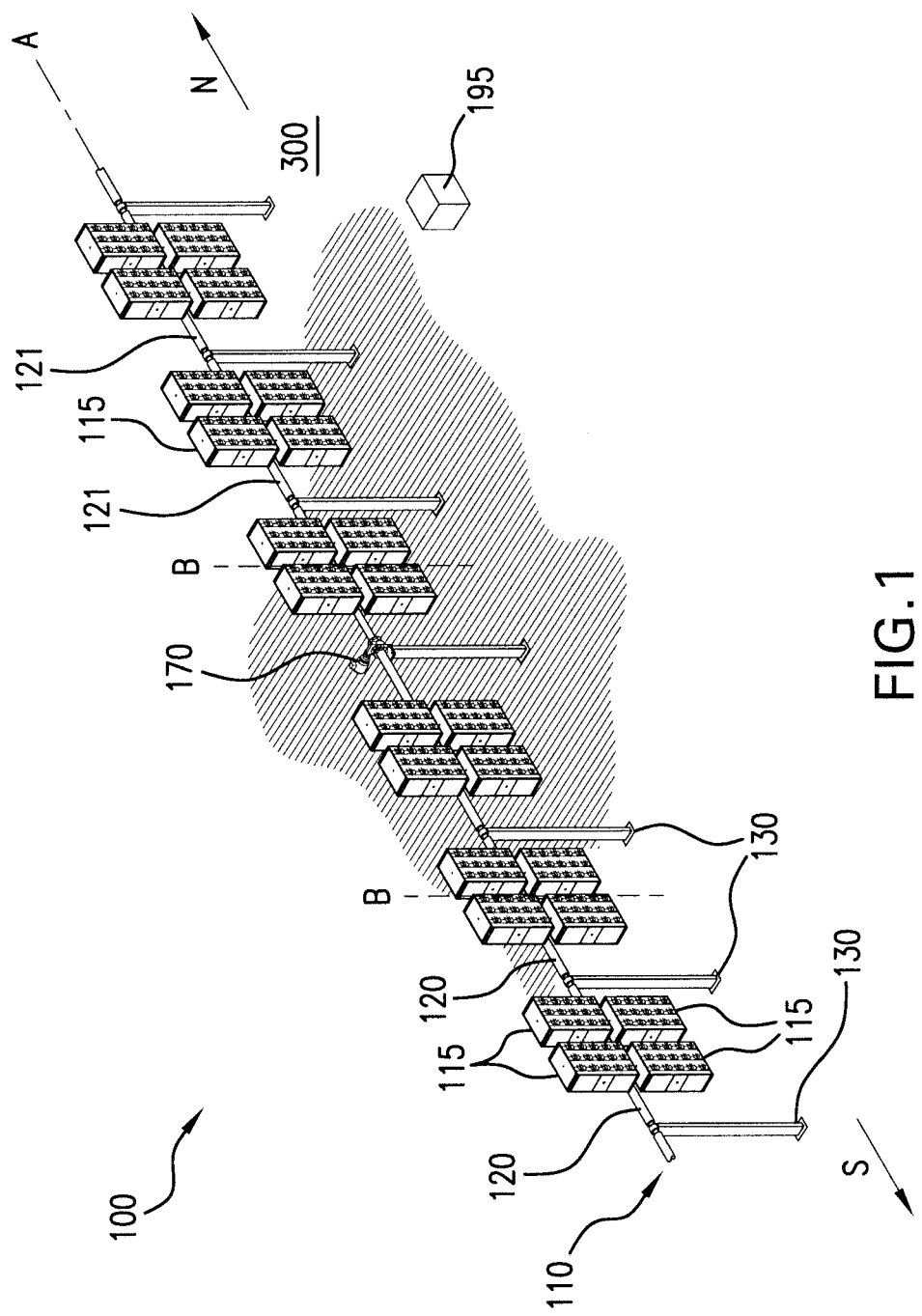
FIG. 1 is a perspective view of a terrestrial photovoltaic solar cell tracking array according to some embodiments of the present invention.

FIG. 1 illustrates an embodiment of an assembled solar array generally illustrated as element 100. The array 100 includes an elongated frame 110 with a torque tube 120 configured to mount various numbers of solar cell modules 115. The frame 110 is able to rotate each of the solar cell modules 115 along a first axis A to simultaneously track the elevation of the sun during the course of a day. The frame 110 also rotates each solar cell module 115 along axes B that are substantially perpendicular to axis A to track the azimuthal position of the sun during the course of the day. The frame 110 also includes vertical supports 130 spaced along the length of the torque tube 120 to position the torque tube 120 above the surface of a supporting surface 300.

The array 100 is constructed from two or more discrete sections 121 that are assembled together. Each section 121 forms a portion of the torque tube 120 and one or more solar cell modules 115. The sections 121 are connected together to allow rotation of the solar cell modules 115 about each of the first and second axes A, B. The modular design provides for a user to construct the frame 110 to a size that supports a necessary number of solar cell modules 115. Each of the sections 121 may include the same or different sizes, numbers, and configurations of solar cell modules 115. Additional sections 121 may be added to a frame 110 of an existing solar array 100 to accommodate additional solar cell modules 115 as is necessary to increase the power output of the array 100.

The torque tube 120 includes an elongated shape with a length to accommodate the required number of solar cell modules 115. The torque tube 120 is constructed of a number of separate sections 121 that are attached together in an end-to-end orientation in a collinear manner. Each of the sections 121 may have the same physical characteristics (e.g., length, diameter, shape, weight), or one or more of the sections 121 may include different characteristics. According to some embodiments of the present invention, the solar array 100 includes two different types of sections 121: a first section 121a that includes a linear actuator 190; and a second section 121b that does not include the linear actuator 190. According to some embodiments of the present invention, the solar array 100 includes a single first section 121a, and two or more second sections 121b. In one specific embodiment, the sections 121 are each hollow pipes with a diameter of about 4 inches, a thickness of about 0.167 inches, a length of about 192", and a weight of about 110 lbs.

Figure 2:
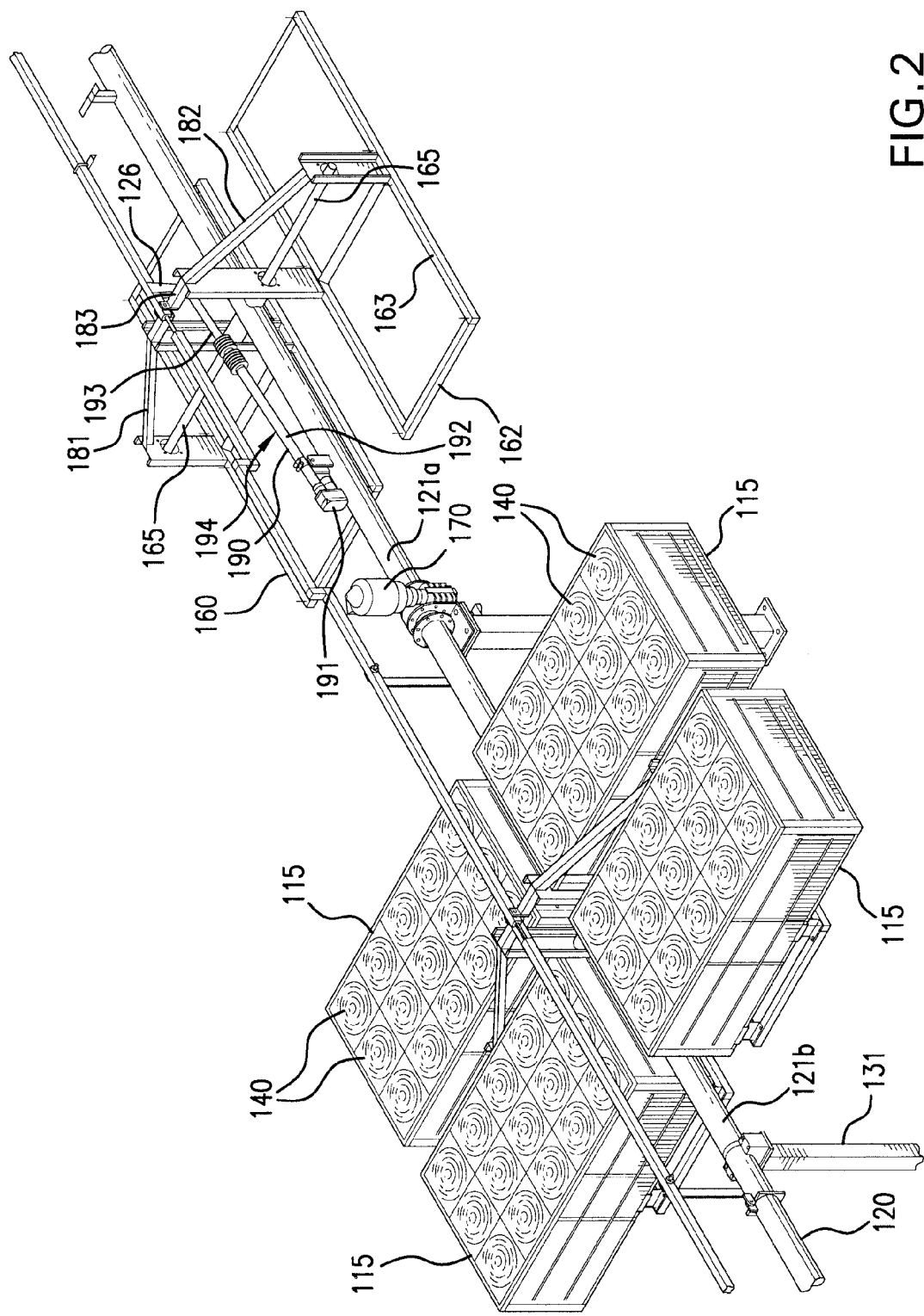
FIG. 2 is a partial perspective view of a partially assembled terrestrial photovoltaic solar cell tracking array according to some embodiments of the present invention.

As illustrated in FIG. 2, mounts 160 are connected to the torque tube 120 and support the solar cell modules 115. According to some embodiments of the present invention, each section 121 includes at least one mount 160 to support at least one solar cell module 115. The mounts 160 may include vertical members 162 that are perpendicular to the torque tube 120, and horizontal members 163 that are parallel to the torque tube 120. Mounts 160 may be of different sizes to accommodate different numbers of solar cell modules 115. Mounts 160 may also include a pivot member 165 that facilitates pivoting motion of the solar cell modules 115 about the second axes B. The pivot member 165 may be a single elongated member or may be constructed of separate members that are positioned in an end-to-end orientation and connected at the torque tube 120. Supports 181, 182, 183 extend between an outer extent of the mounts 160 away from the torque tube 120 and a linkage 150 that extends along the torque tube 120. The supports 181, 182, 183 facilitate rotation of the mount 160 and attached solar cell modules 115 about one of the axes B as will be explained in more detail below.

The mounts 160 may be positioned at various spacings along the length of the torque tube 120. The mounts 160 may be aligned along the torque tube 120 in offsetting pairs on opposing sides of the torque tube 120 directly across from one another as illustrated in FIGS. 1 and 2. Other offset positioning may include the mounts 160 unevenly spread along the length with equal numbers of mounts 160 extending outward from each opposing side of the torque tube 120. The offset positioning assists to balance the array 100 and facilitate rotation about the first axis A. Other configurations may include uneven numbers of mounts 160 extending outward from the opposing sides of the torque tube 120. According to some embodiments, a single solar cell module 115 extends from each section 121 of the torque tube 120.

The vertical supports 130 are spaced apart along the length of the torque tube 120 to position the solar cell modules 115 above the surface 300 for rotation about the first axis A. The vertical supports 130 include a vertical post 131 and a base 132. The vertical posts 131 include a length greater than the solar cell modules 115 for rotation about axis A. The bases 132 include an enlarged area that is greater than the posts 131 and are configured to contact against the surface 300. In one specific embodiment, the vertical posts 131 include a 4 inch by 4 inch rectangular shape with a thickness of about 0.188 inches, and the bases 132 include an enlarged area and are supported by a concrete pad.

The vertical supports 130 are positioned along the torque tube 120 away from the mounts 160 to prevent interference with the movement of the solar cell modules 115. As illustrated in FIG. 1, the vertical supports 130 are spaced-apart from the solar cell modules 115 along the length of the torque tube 120. In this arrangement, the vertical supports 130 are in a non-overlapping arrangement with the solar cell modules 115. Various numbers of vertical supports 130 may be positioned along the length of the torque tube 120. According to some embodiments of the present invention, at least one vertical support 130 is connected to each discrete section 121 of the torque tube 120. In the embodiment of FIG. 1, a vertical support 130 is positioned between each pair of mounts 160. In other embodiments, the vertical supports 130 are spaced a greater distance apart along the torque tube 120.

One or more drives 170 are connected to the torque tube 120 to provide a force to rotate the torque tube 120 about axis A. According to some embodiments of the present invention, a single drive 170 rotates the torque tube 120 and is positioned at an end of the torque tube 120. Another embodiment includes a single drive 170 centrally located along the torque tube 120. Other embodiments include multiple drives 170 positioned along the length of the torque tube 120. The drives 170 may include a drive train with one or more gears that engage with the torque tube 120. Additional details about embodiments of the drive 170 are included below.

The array 100 is designed to balance the power load requirements of the one or more drives 170 during rotation through the various angular positions about the first axis A. One manner of balancing the load requirements is placing the mounts 160 and solar cell modules 115 such that a center of gravity of the array 100 is aligned with the torque tube 120. FIG. 1 illustrates an example of this positioning with equal numbers of solar cell modules 115 extending outward from the opposing sides of the torque tube 120. FIG. 1 illustrates the solar cell modules 115 aligned in pairs that are directly across the torque tube 120 from each other. Other spacings of the mounts 160 and solar cell modules 115 may also be used for balancing the load requirements. The balanced array 100 maintains a near constant potential energy as rotation in a first direction is facilitated by the weight of the solar cell modules 115 that extend outward from a first side, and rotation in a second direction is facilitated by the opposing solar cells 115 that extend outward from a second side of the torque tube 120.

Linkages 150 are connected to the mounts 160 to rotate the solar cell modules 115 about the second axes B. The linkages 150 are attached together in a string aligned substantially parallel to the torque tube 120. The linkages 150 are also connected to each of the mounts 160.

As illustrated in FIG. 2, a linear actuator 190 provides a force to the linkages 150 to move the linkages 150 in first and second directions along the torque tube 120. The linear actuator 190 includes a drive 191 and an extension 194 with a first section 192 and a second section 193. The first and second sections 192, 193 are in a telescoping arrangement with the first section 192 attached to the torque tube 120 and the second section 193 attached to the linkages 150. Activation of the drive 191 moves the second extension 193 into and out of the first extension 192 to adjust the overall length. This movement drives the linkages 150 in first and second directions along the torque tube 120 to rotate the mounts 160 and associated solar cell modules 115 about the axes B. Elongation of the extension 194 causes rotation about the axes B in a first direction, and reduction in the length of the extension 194 causes rotation in a second direction about the axes B. The movement causes the mounts 160 to rotate about the pivot member 165.

The number of linkages 150 in the string that is moved by the linear actuator 190 may vary. According to some embodiments of the present invention, a single linear actuator 190 rotates each of the solar cell modules 115. Other embodiments include two or more linear actuators 190.

According to some embodiments of the present invention, a single linear actuator 190 is positioned on the section 121*a* at an end of the torque tube 120. Other embodiments position the single linear actuator 190 at a central location along the torque tube 120.

The solar cell modules 115 are configured to convert the sunlight into electrical energy. According to some embodiments of the present invention as illustrated in FIG. 2, the solar cell modules 115 are each about 43" by 67". The solar cell modules 115 may include an aluminum frame and plastic or corrugated plastic sides that reduce the overall weight to about 70 pounds. In one embodiment, each solar cell module 115 includes a planar upper surface that includes an array of lenses 140 that are positioned over corresponding receivers. According to some embodiments of the present invention, the modules 115 include a 3×5 array of lenses 140 as illustrated in FIG. 2. Other embodiments may include different numbers and/or arrangements of the lenses 140. In one specific embodiment, the module 115 includes a single lens 140. The lenses 140 may include various shapes and sizes with one specific embodiment including lenses that are about 13" square. Further, the focal length between the lenses 140 and the receivers is about 20". Each receiver may include one or more III-V compound semiconductor solar cells.

When mounted on the surface 300, the torque tube 120 may be positioned in a north N-south S orientation as illustrated in FIG. 1. In one embodiment, the surface 300 is the surface of the Earth. The torque tube 120 includes a length to space a desired number of solar cell modules 115. Throughout the course of the day, the array 100 is adjusted to maintain the solar cell modules 115 facing towards the sun. The drive 170 may be periodically activated to provide a force to rotate the torque tube 120 and hence each of the mounts 160 and attached solar cell modules 115. According to some embodiments of the present invention, the force applied by the drive 170 provides for each of the solar cells receivers 115 to be moved a same amount such that each solar cell array module 115 is synchronized and moved in unison.

In addition to the rotation of the torque tube 120, the one or more linear actuators 190 moves the linkages 150 to further maintain the solar cell modules 115 aligned with the sun. The one or more drives 180 are periodically activated to move the drive linkages 144 and attached string of linkages 150. This movement causes the attached mounts 160 and solar cell modules 115 to pivot about the various axes B. These axes B may be orthogonal to the axis A. The string of linkages 150 provides for each of the solar cell modules 115 to again move in unison about their respective axis B. The movement about the B axes may allow the solar cell modules 115 to track the azimuthal position of the sun.

A controller 195 as schematically illustrated in FIG. 1 may control the movement of one or more arrays 100 and the positioning of the modules 115 relative to the sun. The controller 195 may include a microcontroller with associated memory. In one embodiment, controller 195 includes a microprocessor, random access memory, read only memory, and an input/output interface. The controller 195 controls operation of the one or more drives 170 for rotating the torque tube 120 and the solar cell modules 115 about the first axis A. The controller 195 further controls the one or more linear actuators 190 for driving the linkages 150 and rotating the solar cell modules 115 about the second axes B. The controller 195 may include an internal timing mechanism such that the operation of the drives corresponds to the day and the time for the solar cell modules 115 to track the azimuth and elevation of the sun. The controller 195 may be operatively connected to the solar array 100 by one or more hardwire connections (not illustrated) or by a wireless interface.

According to some embodiments of the present invention, the components of the solar array 100 are assembled together at the installation site. This practice makes it easier to individually transport and install each of the components, as opposed to attempting to transport and install the entire pre-assembled solar array 100 to the installation site. The solar array 100 may be packaged in kits that facilitate transporting the array 100. Further, the assembling at the installation site provides for altering the solar array 100 if necessary due to previously unforeseen issues that arise at the installation site. The ability to assemble at the installation site also provides for altering an existing, previously-installed solar array 100 (e.g., adding additional solar cell modules 115 to an existing solar array 100). The solar array 100 may be packaged for straight-forward assembly that can be accomplished by relatively inexperienced labor, and/or performed quickly. Alternatively, the solar array 100 may be entirely or partially assembled remotely and subsequently transported to the installation site.

Figure 3:
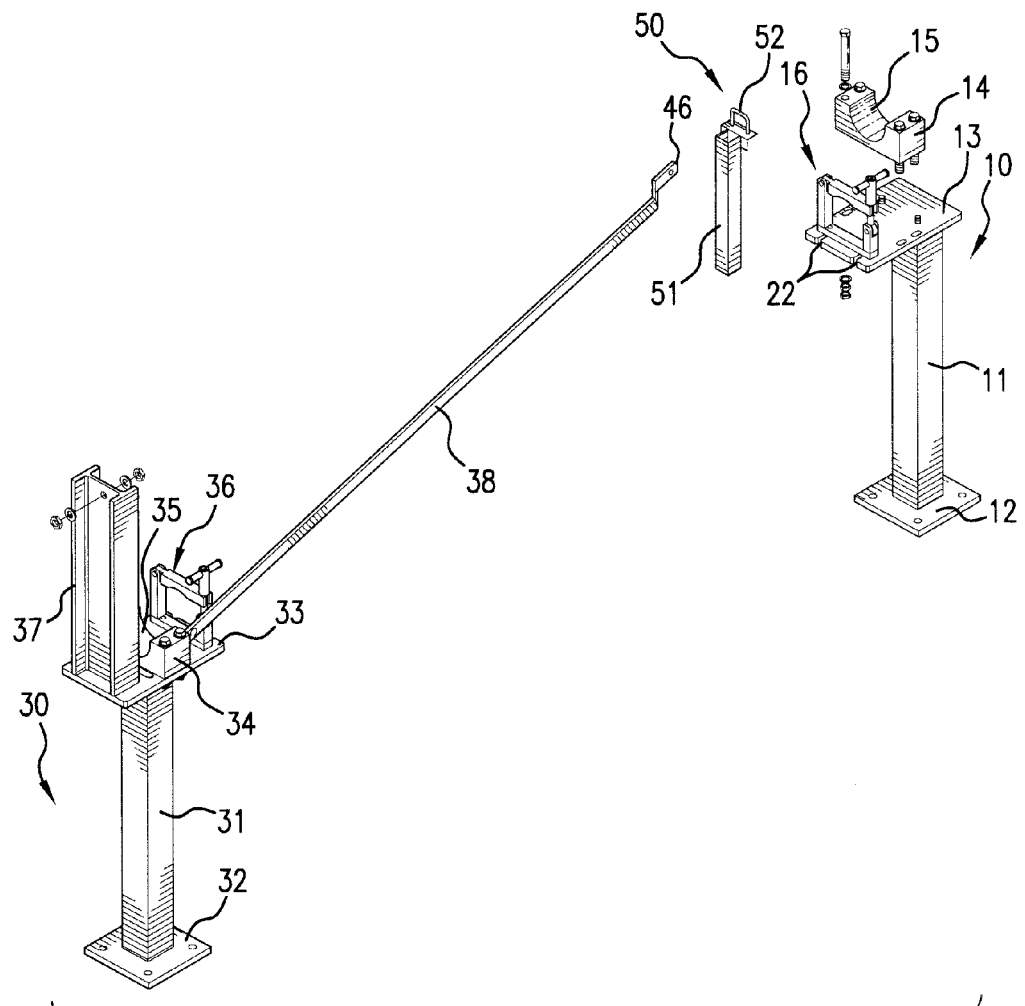
FIG. 3 is a perspective view of first and second alignment fixtures according to some embodiments of the present invention.

The process of assembling the solar array 100 includes assembling one or more of the sections 121 and subsequently attaching the sections 121 together. The assembly process includes attachment of one or more mounts 160 and modules 115 to each of the sections 121. FIG. 3 illustrates a first alignment fixture 10 and a second alignment fixture 30 used for assembling one of the discrete sections 121 of the solar array 100. The alignment fixtures 10, 30 are configured to receive and secure the section 121 while at least one or more mounts 160 and solar cell modules 115 are attached. The alignment fixtures 10, 30 are further configured to release the completed section 121 for attachment with one or more other sections 121 that form the solar array 100.

The first alignment fixture 10 generally includes a leg 1 having a height to position the discrete section 121 above a support surface, such as the Earth or an installation pad out in the field at a solar array 100 installation site. A base 12 with an enlarged surface area is positioned at a first end of the leg 1 to contact against the support surface. One or more apertures may extend through the base 12 to receive fasteners to secure the first alignment fixture 10 to the support surface. A support member 13 is positioned at a second end of the leg 1. The support member 13 may include a flat surface, and may include an enlarged surface area to mount and support various components for securing an end of the section 121. Apertures may be positioned about the support member 13 to receive fasteners for securing the components.

Figure 4A:
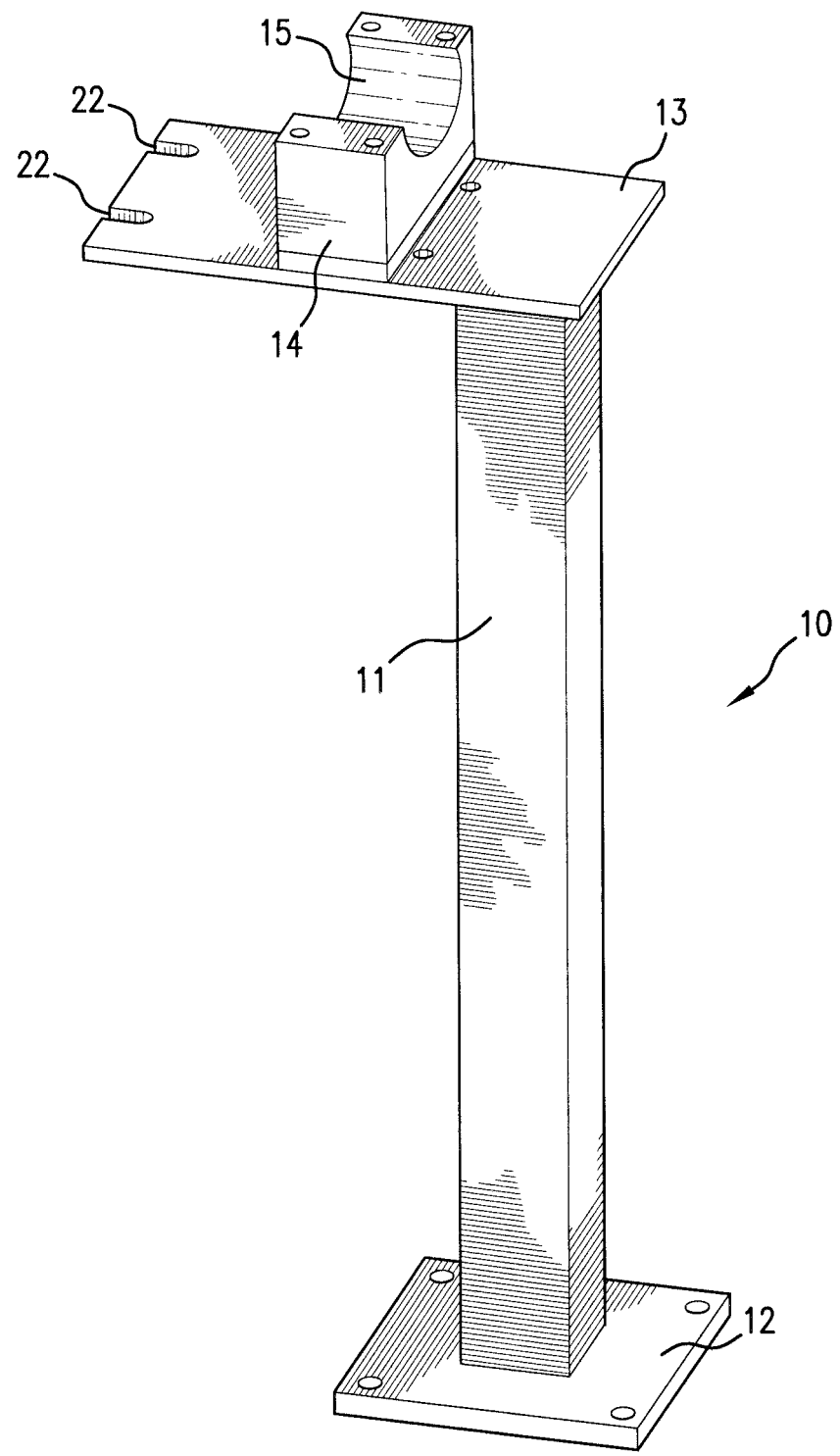
FIG. 4A is a perspective view of a receptacle mounted on a first alignment fixture according to some embodiments of the present invention.
Figure 4B:
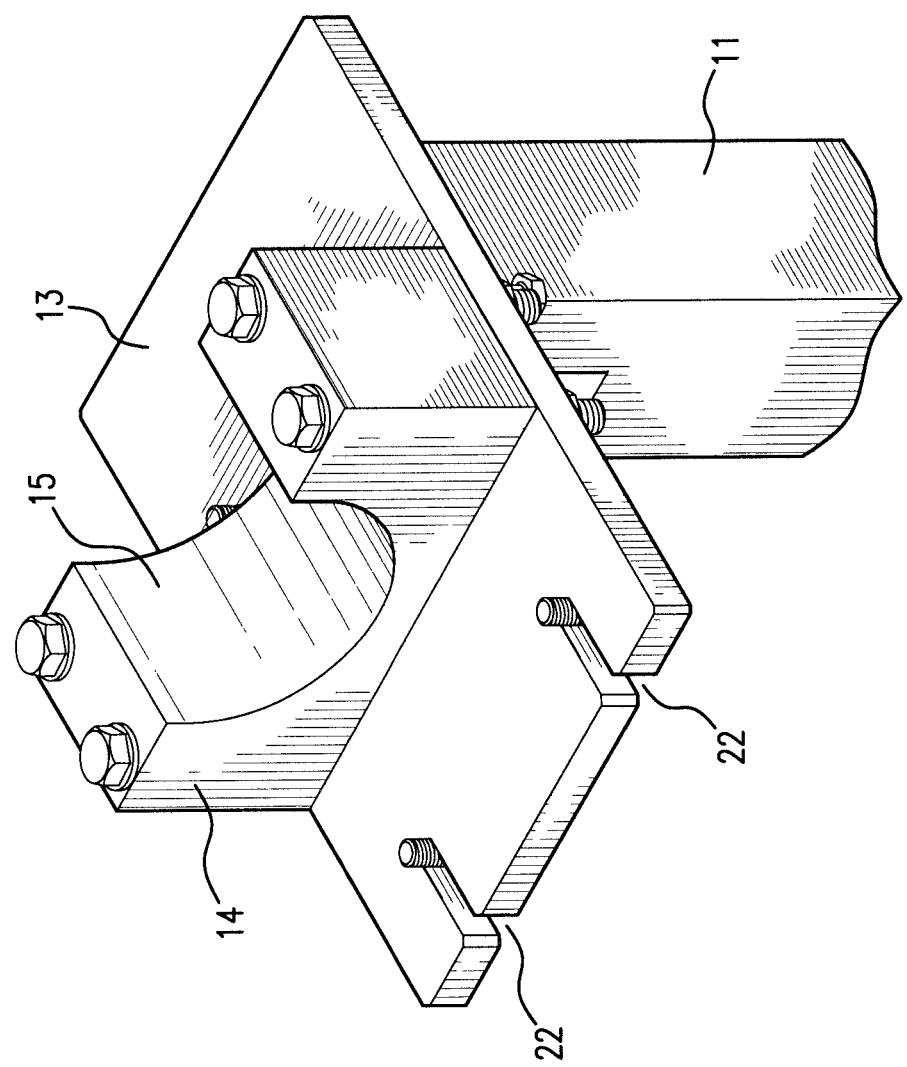
FIG. 4B is a perspective view of a receptacle mounted on a first alignment fixture according to some embodiments of the present invention.

As illustrated in FIGS. 3, 4A, and 4B, a receptacle 14 is attached to the support member 13 and includes a scalloped groove 15 to receive the section 121. According to some embodiments of the present invention, the groove 15 is sized and shaped to match the exterior of the section 121. Examples include semi-circular, semi-square, and semi-oval shapes. One or more fasteners may extend through the receptacle 14 and the support member 13 to connect the elements together.

Figure 5:
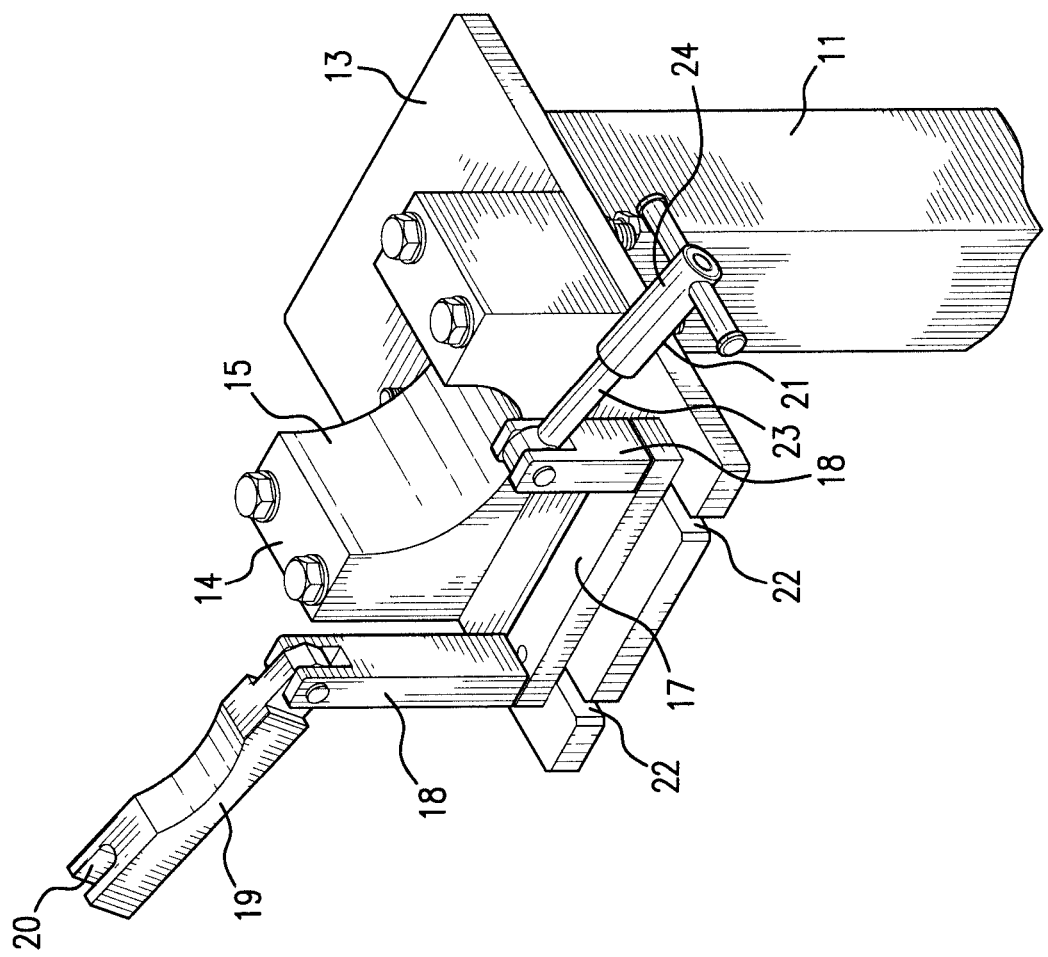
FIG. 5 is a perspective view of a clamp in an open orientation and a receptacle mounted on a first alignment fixture according to some embodiments of the present invention.

As illustrated in FIGS. 3 and 5, a clamp 16 is also attached to the support member 13 to receive and secure the section 121. Fasteners may extend through the clamp 16 and through notches 22 in the support member 13 to secure the clamp 16. The clamp 16 is adjacent to the receptacle 14 to maintain the section 121 in the receptacle 14 and in contact with the groove 15. The clamp 16 includes a base 17 that seats against the support member 13, and a pair of extensions 18 that are spaced apart and extend outward above the surface of the support member 13. An arm 19 with a notched end 20 is pivotally attached to the first extension 18. An underside of the arm 19 may be scalloped to match the exterior shape of the section 121. A tightening mechanism 21 with threaded first and second sections 23, 24 is pivotally attached to the second extension 18. The first section 23 includes exterior threads that mate with interior threads on the second section 24. Rotation of the second section 24 relative to the first section 23 adjusts an overall length of the second extension 18. The second section 24 may further include a handle to facilitate rotation.

Figure 6:
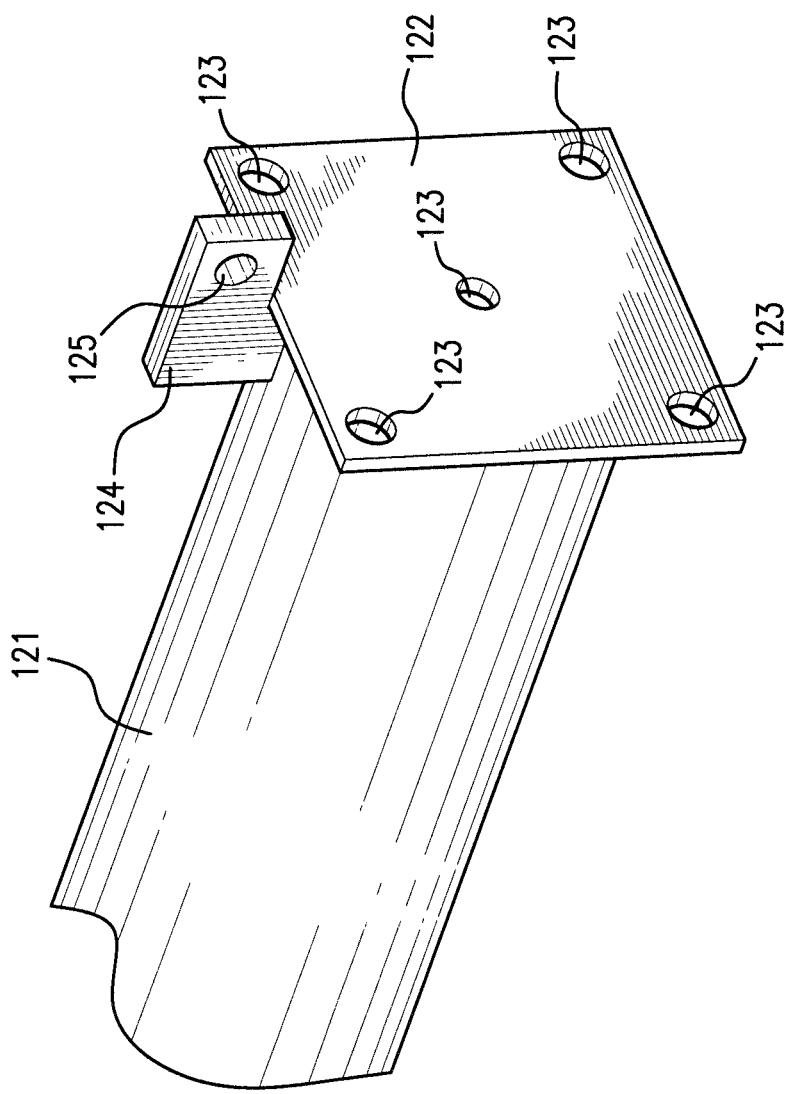
FIG. 6 is a perspective view of an end of a section of a torque tube according to some embodiments of the present invention.

FIG. 6 illustrates an end of a section 121 that is attached to the first alignment fixture 10. The section 121 includes an exterior shape that matches the groove 15 of the receptacle 14. In this specific embodiment, the section 121 includes a circular cross-sectional shape. A flange 122 is attached to an end of the section 121 and extends radially outward beyond the surface of the section 121. According to some embodiments of the present invention, the flange 122 extends outward from each side of the section 121. Other embodiments include the flange 122 extending outward from fewer than each side. FIG. 6 illustrates the flange 122 having a rectangular shape, although the flange 122 may include other shapes. One or more apertures 123 extend through the flange 122 to receive fasteners for attaching the section 121 to an adjacent section 121, drive 170, or other section of the array 100.

A fin 124 with a flattened shape is attached to an end of the section 121. The fin 124 extends radially and axially outward beyond the section 121 and the flange 122. An aperture 125 extends through the fin 124 to receive a fastener for attachment to another section 121 or other section of the array 100. The aperture 125 is positioned radially above and axially beyond the flange 122 to be accessible during attachment to other elements.

Figure 7:
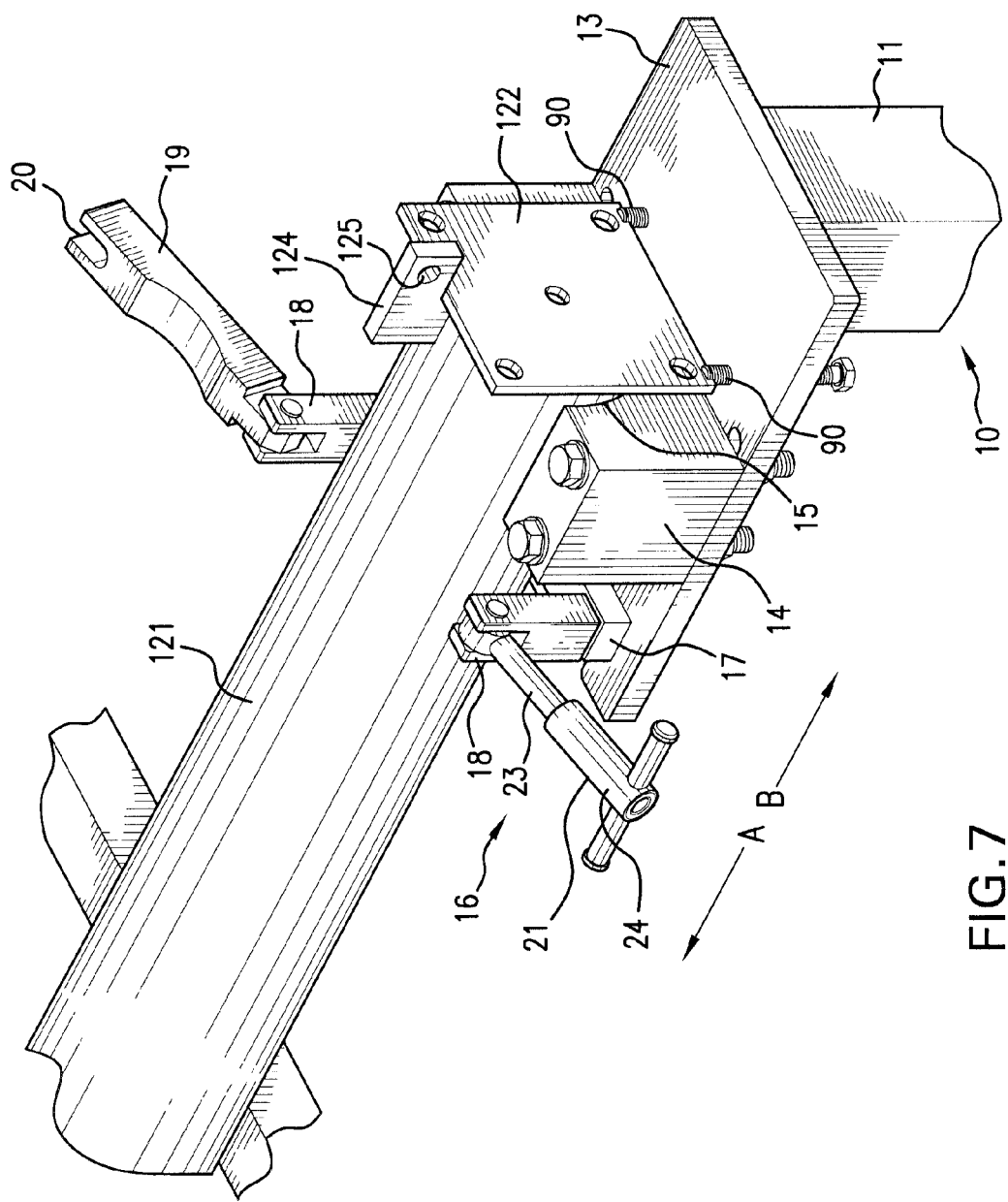
FIG. 7 is a perspective view of a section of a torque tube positioned in a first alignment fixture with a clamp in an open orientation according to some embodiments of the present invention.
Figure 8:
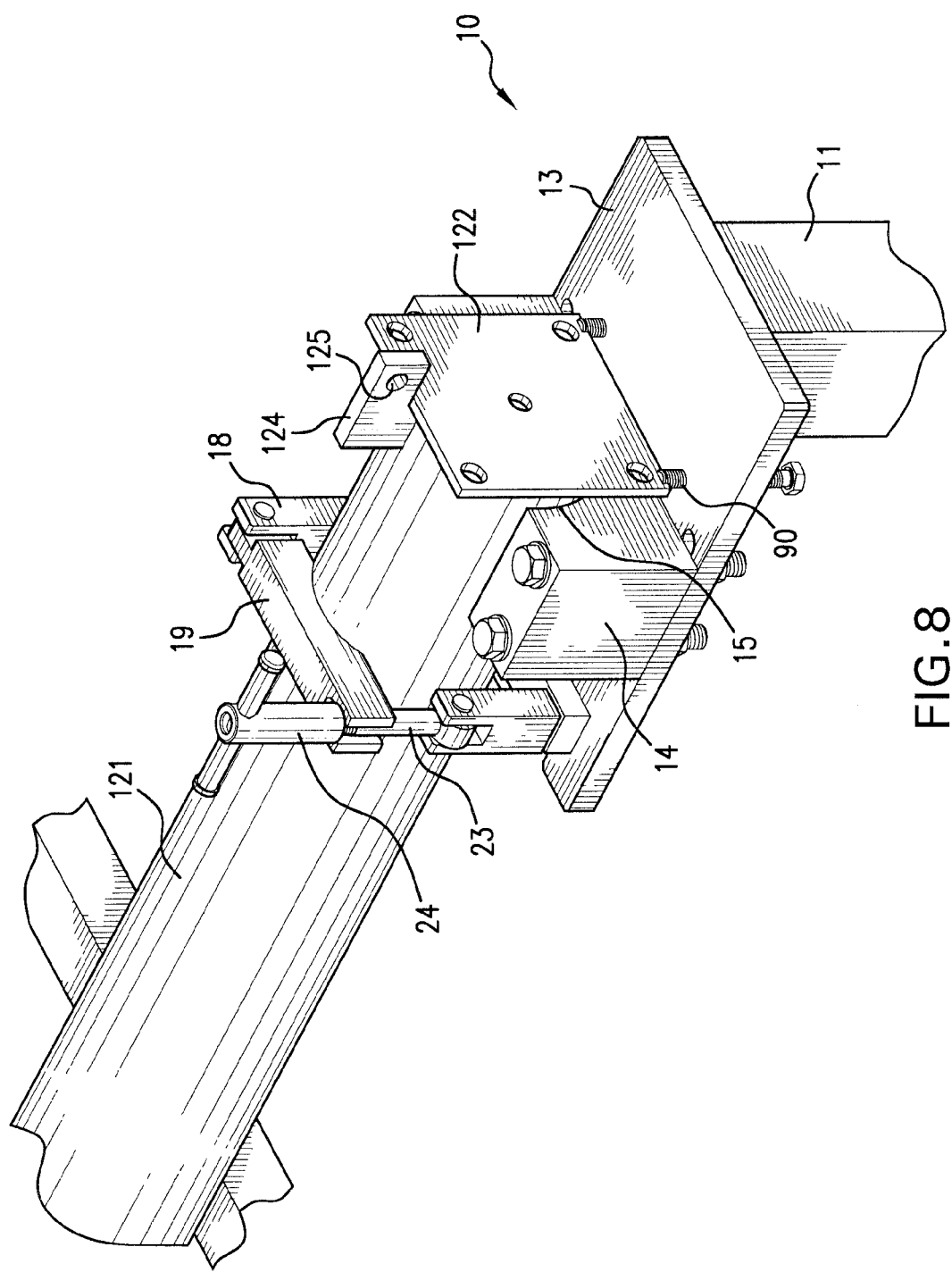
FIG. 8 is a perspective view of a section of a torque tube positioned in a first alignment fixture with a clamp in a closed orientation according to some embodiments of the present invention.

FIGS. 7 and 8 illustrate positioning and securing the section 121 within the first alignment fixture 10. As illustrated in FIG. 7, the clamp 16 is in an open orientation with the arm 19 and tightening mechanism 21 each pivoted away from the base 17 to form an opening to receive the section 121. Further, the section 121 is positioned within the receptacle 14 and in contact with the groove 15. The flange 122 at the end of the section 121 is positioned beyond the receptacle 14. According to some embodiments of the present invention, the receptacle 14 extends above the support 13 an amount that the flange 122 is spaced away from the surface of the support 13. In other embodiments, the flange 122 contacts the support 13.

After the section 121 is positioned in the clamp 16 and receptacle 14, the clamp 16 is moved to a closed orientation as illustrated in FIG. 8. Closing the clamp 16 includes pivoting the arm 19 to extend over the section 121. The arm 19 has a length to extend across the section 121 with the notch 20 at the end of the arm 19 being exposed towards the opposing extension 18. The tightening mechanism 21 is also pivoted about its extension 18 and into the notch 20. According to some embodiments of the present invention, the first section 23 is sized to fit into the notch 20 and the second section 24 is larger than the notch 20. The tightening mechanism 21 is pivoted to position the first section 23 in the notch 20 and the second section 24 above the notch (i.e., on an opposing side of the notch 20 from the extension 18). The second section 24 is rotated relative to the first section 23 to reduce an overall length of the mechanism 21 and apply a force to further pivot the arm 19 downward onto the section 121.

The section 121 is axially held in position to prevent sliding along the support 13. The flange 122 abuts against the edge of the receptacle 14 to prevent the section 121 from sliding in the direction of arrow A in FIG. 7. Movement in both directions of arrows A and B may be prevented by the compressive force applied by the clamp 16 that forces the section 121 against the groove 15. Fasteners 90 that extend through the support 13 may also prevent axial movement of the section 121. According to some embodiments of the present invention, the fasteners 90 contact against an edge of the flange 122. This contact may prevent movement in one or both of directions A and B. In other embodiments, the fasteners 90 are positioned in front of the flange 122 (i.e., the flange 122 is positioned in a space formed between the fasteners 90 and the receptacle 14). The flange 122 is constrained from sliding beyond the space.

Figure 9:
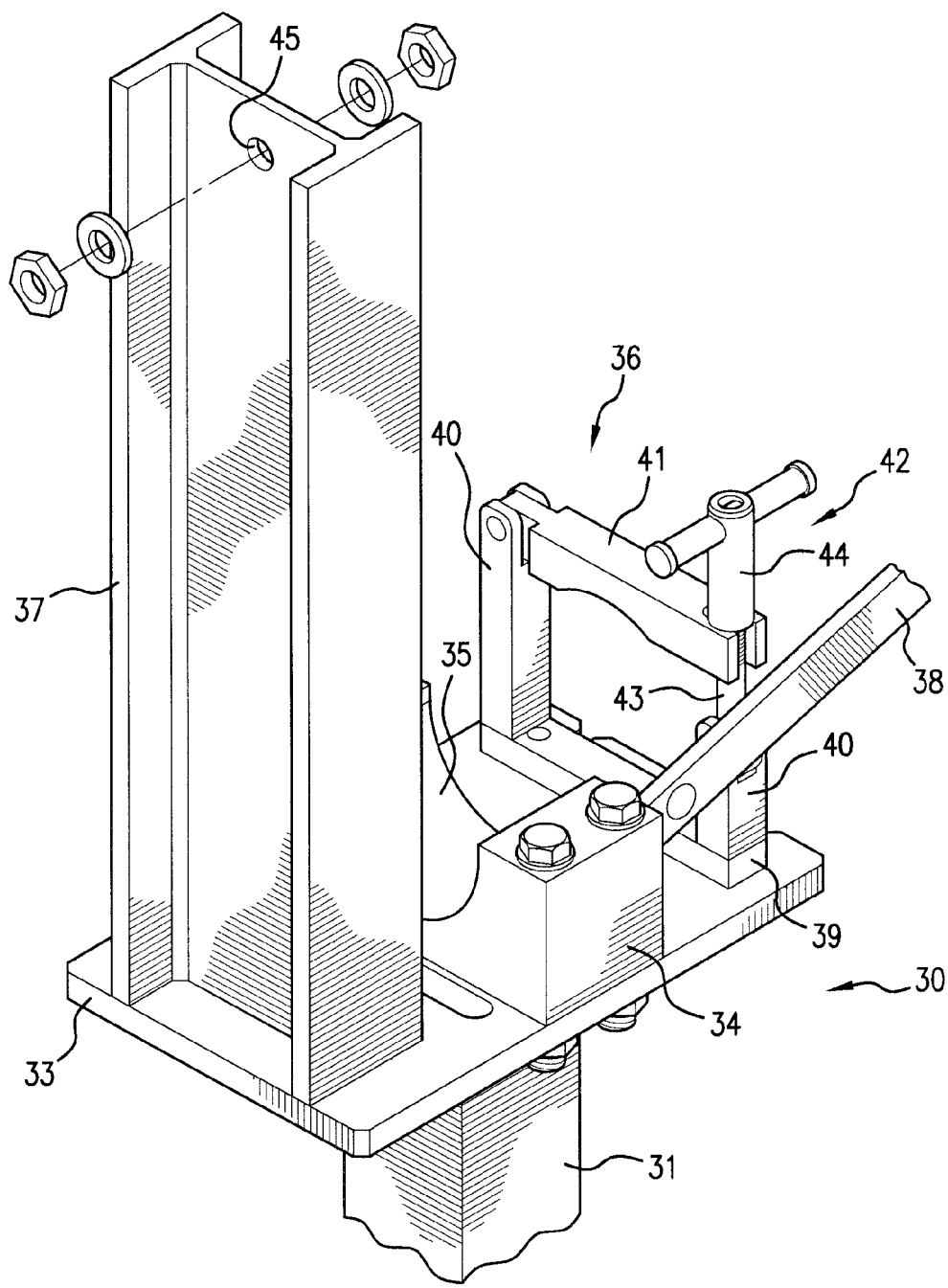
FIG. 9 is a perspective view of a second alignment fixture according to some embodiments of the present invention.

FIGS. 3 and 9 illustrate the second alignment fixture 30. According to some embodiments of the present invention, the second alignment fixture 30 has many of the same components as the first alignment fixture 10. The second alignment fixture 30 generally includes a leg 31 with a base 32 at a first end with an enlarged surface area to contact against the support surface. A support member 33 is positioned at a second end of the leg 31 and includes an enlarged flat surface to mount and support various components for assembling the section 121. Apertures may be positioned about the support member 13 to receive fasteners for securing the components. A receptacle 34 with a scalloped groove 35 is attached to the support member 13 to receive the section 121. The groove 35 may be sized and shaped to match the exterior of the section 121. One or more fasteners may extend through the receptacle 14 and the support member 13 to connect these elements together.

A clamp 36 is positioned adjacent to the receptacle 34 to receive and secure the section 121. The clamp includes a base 39 that seats against the support member 33, and a pair of arms 40 that are spaced apart and extend outward above the surface of the support member 33. An arm 41 with a notched end is pivotally attached to the first extension 40, and a tightening mechanism 42 with threaded first and second sections 43, 44 are pivotally attached to the second extension 18. FIG. 9 illustrates the clamp 36 in the closed orientation.

The second alignment fixture 30 also includes an elongated extension 37. The extension 37 includes a first end that contacts against the support member 33 and an opposing second end positioned above the support member 33. An aperture 45 at the second end receives a fastener to secure the linkages 150 during the assembly process as will be explained in detail.

An arm 38 extends outward from a second side of the alignment fixture 30. The arm 38 includes a first end that is attached to the receptacle 34, and a second end 46 positioned outward beyond the second alignment fixture 30 as best illustrated in FIG. 3. The arm 38 includes a predetermined length measured between the ends to position the mount 160 during the assembly process as will be explained in detail.

The assembling system may also include a support 50 as illustrated in FIG. 3. The support 50 positions the components of the sections 121 during the assembly process. The support 50 includes a leg 51 with an eyelet 52 at one end.

Figure 10:
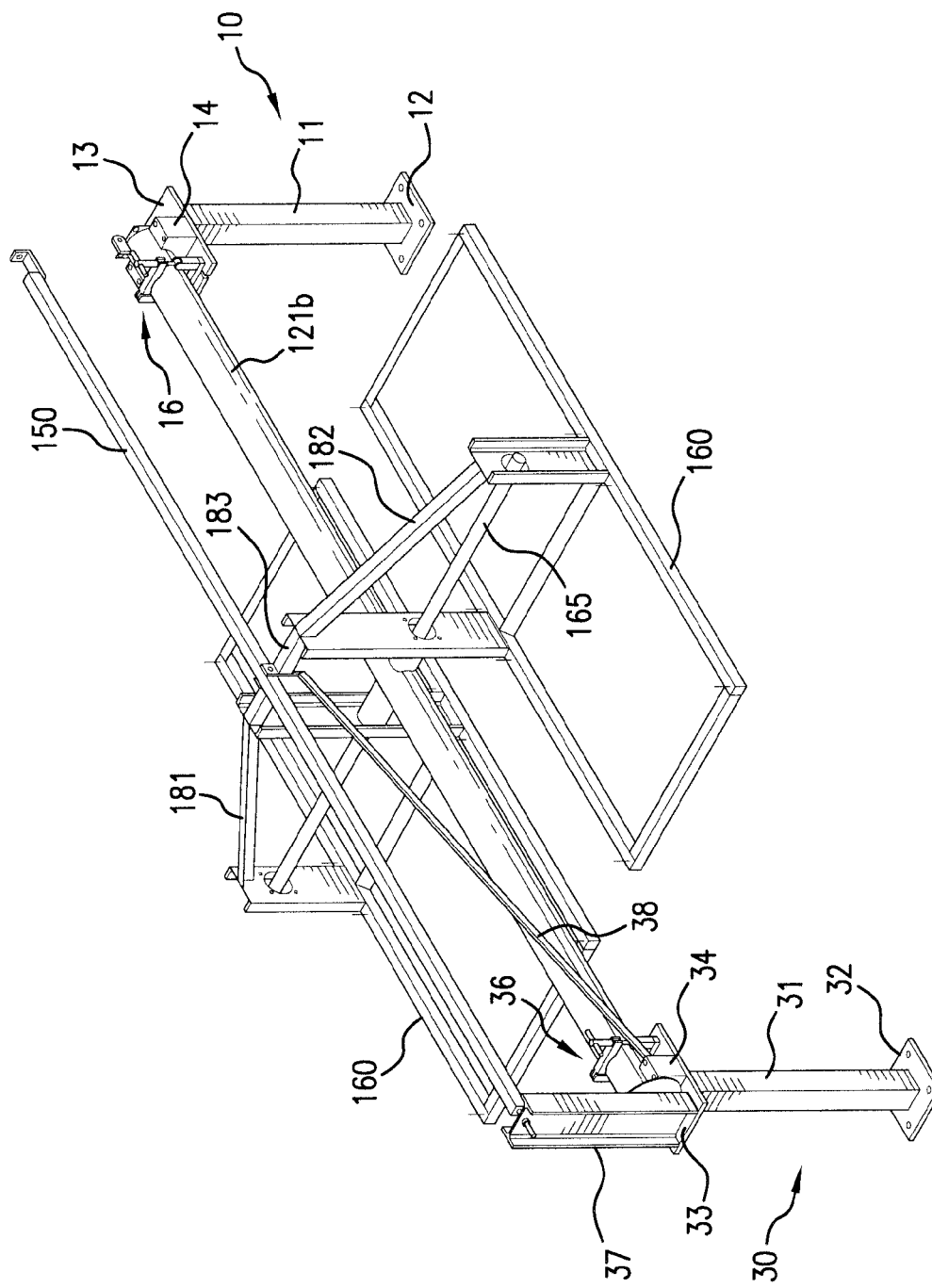
FIG. 10 is a perspective view of a second section secured to first and second alignment fixtures according to some embodiments of the present invention.
Figure 11:
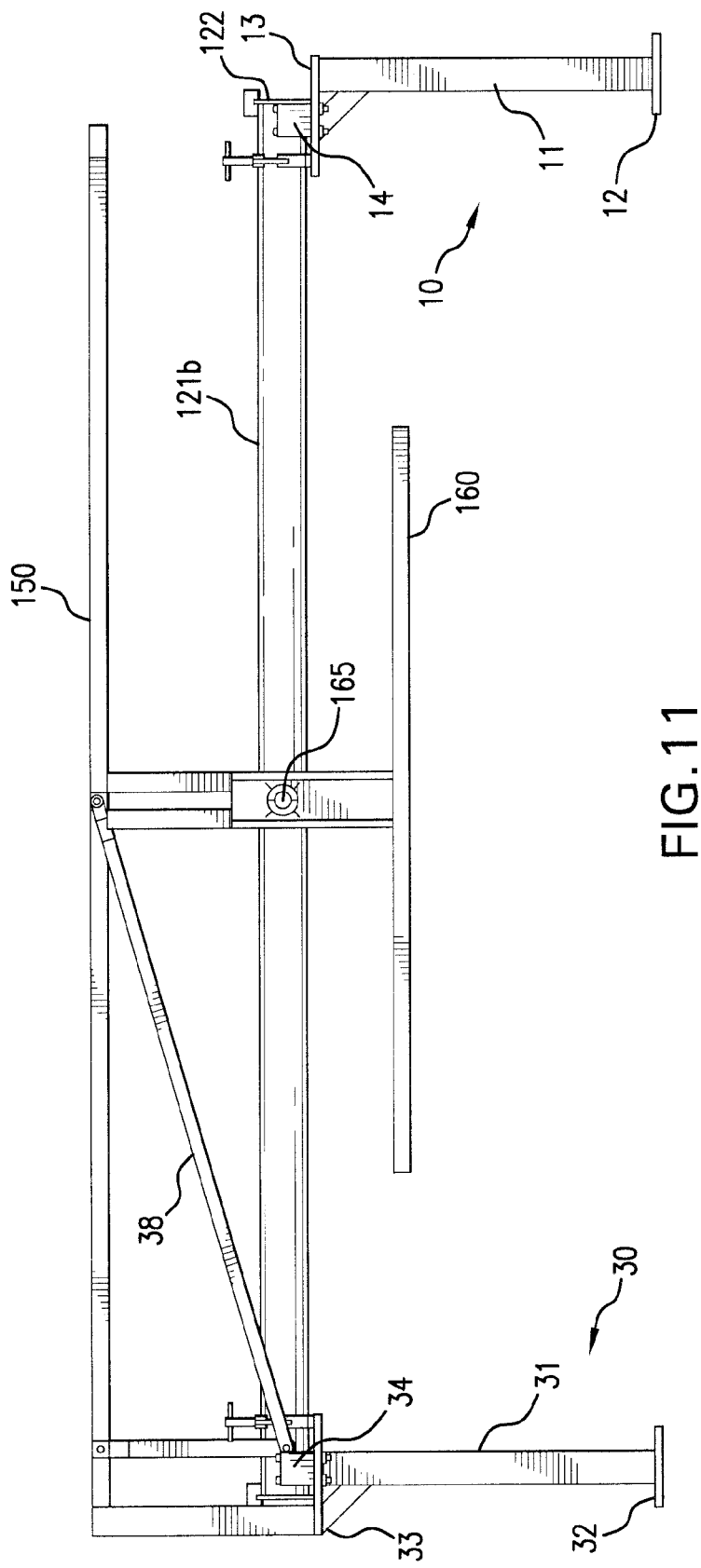
FIG. 11 is a side view of a second section secured to first and second alignment fixtures according to some embodiments of the present invention.

FIGS. 10 and 11 illustrate the first and second alignment fixtures 10, 30 used for construction of a second section 121$b$ of the solar array 100. Prior to mounting the second section 121$b$, the alignment fixtures 10, 30 are positioned a distance apart and secured to a support surface. According to some embodiments, the alignment fixtures 10, 30 are portable and brought to an installation sight for assembling the second section 121$b$. The second section 121$b$ is then secured to the alignment fixtures 10, 30 with a first end of the second section 121$b$ positioned in the first alignment fixture 10, and a second end positioned in the second alignment fixture 30.

After the second section 121$b$ is secured in the alignment fixtures 10, 30, one or more mounts 160 are aligned and attached to the second section 121$b$. In the embodiment of FIGS. 10 and 11, a mount 160 is attached to the section 121$b$ and extends outward on opposing sides of the section 121$b$. Various numbers and configurations of mounts 160 may be attached to the second section 121$b$ as necessary. The mounts 160 include a pivot member 165 that extends through the second section 121$b$ and is attached for pivoting movement about the B axis.

The arm 38 extending outward from the second alignment fixture 30 positions and aligns the mount 160 relative to the section 121$b$. The mount 160 is aligned along the section 121$b$ and aligned with the end 46 of the arm 38. When the mount 160 is accurately positioned, the end 46 aligns with features on the mount 160. According to some embodiments of the present invention, the end 46 includes an aperture. The aperture aligns with one or more other apertures on the mount 160, linkage 150, and/or arm 183 to receive a fastener when the mount 160 is accurately positioned relative to the section 121$b$.

The linkage 150 is secured to the mount 160 and also secured to the extension 37 at the second alignment fixture 30. The linkage 150 may be secured with a fastener that extends through the aperture 45 at the second end of the extension 37. The linkage 150 is supported in a cantilever fashion at these two locations along the length.

Figure 12:
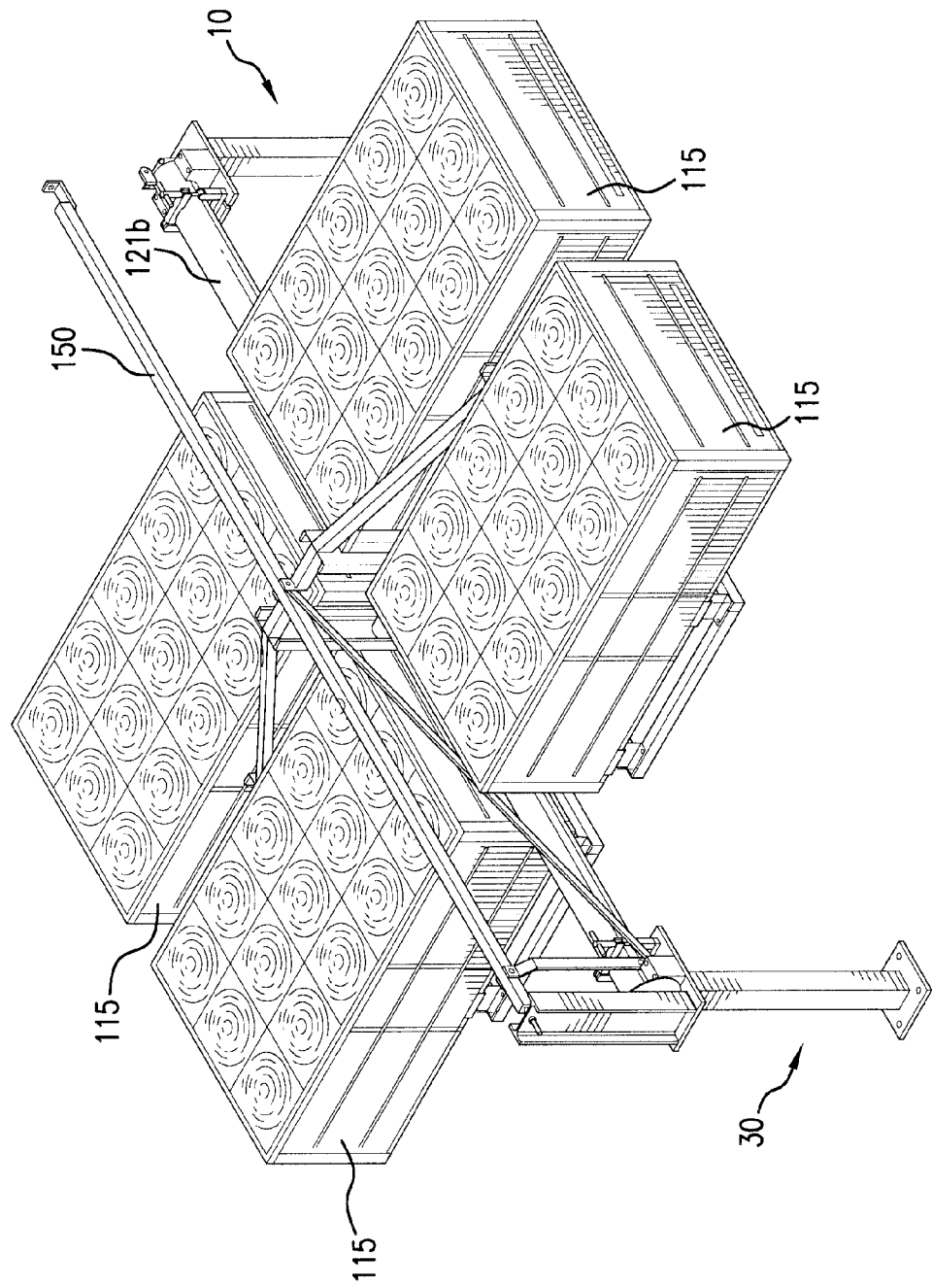
FIG. 12 is a perspective view of a second section with solar modules secured to first and second alignment fixtures according to some embodiments of the present invention.

After the mount 160 is aligned and attached to the section 121$b$, the solar modules 115 are aligned and attached as illustrated in FIG. 12. Mounting the modules 115 is facilitated by the section 121$b$ being secured to the alignment fixtures 10, 30. Alignment may include various steps, including but not limited to simply positioning the modules on the mounts 160, and adjusting the angular position of a top planar surface of the modules 115 relative to the section 121. According to some embodiments of the present invention, the alignment fixtures 10, 30 prevent the section 121$b$ from rotating about the axis A when the solar modules 115 are attached to the mounts 160. In one embodiment, the flanges 122 at the ends of the sections 121b contact against the respective supports 13, 33 and prevent rotation about the axis A.

Figure 13:
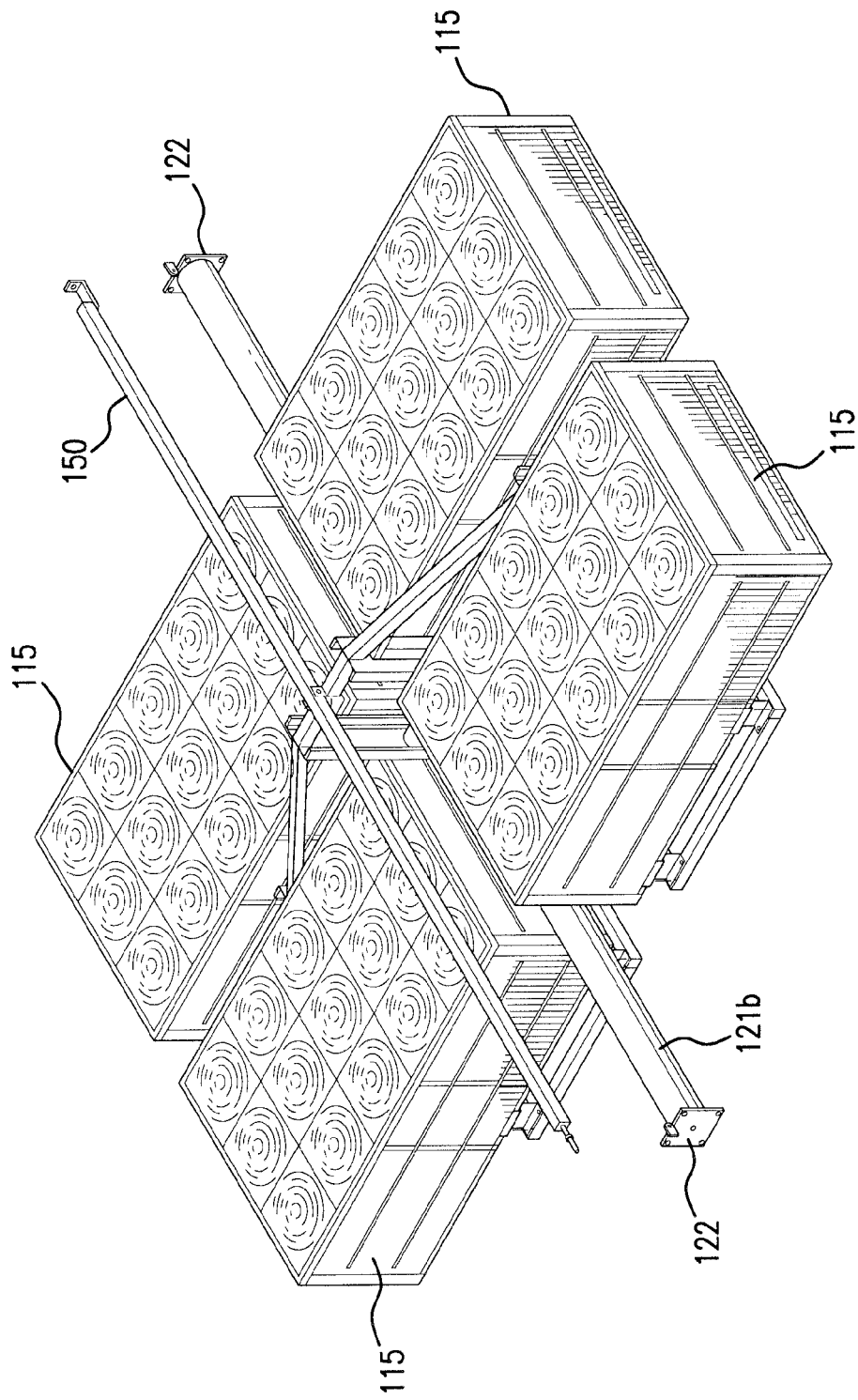
FIG. 13 is a perspective view of a second section with solar modules after removal from the first and second alignment fixtures according to some embodiments of the present invention.

Once the section 121b is assembled, it can be removed from the alignment fixtures 10, 30 as illustrated in FIG. 13. Removal from the first alignment fixture 10 includes opening the clamp 16 and releasing the first end of the section 121b. Removal from the second alignment fixture 30 includes opening the clamp 36, and also removing the fastener in the extension 37 that attaches the linkage 150. The completed section 121b is ready for attachment to the other sections 121 that comprise the solar array 100.

Figure 14:
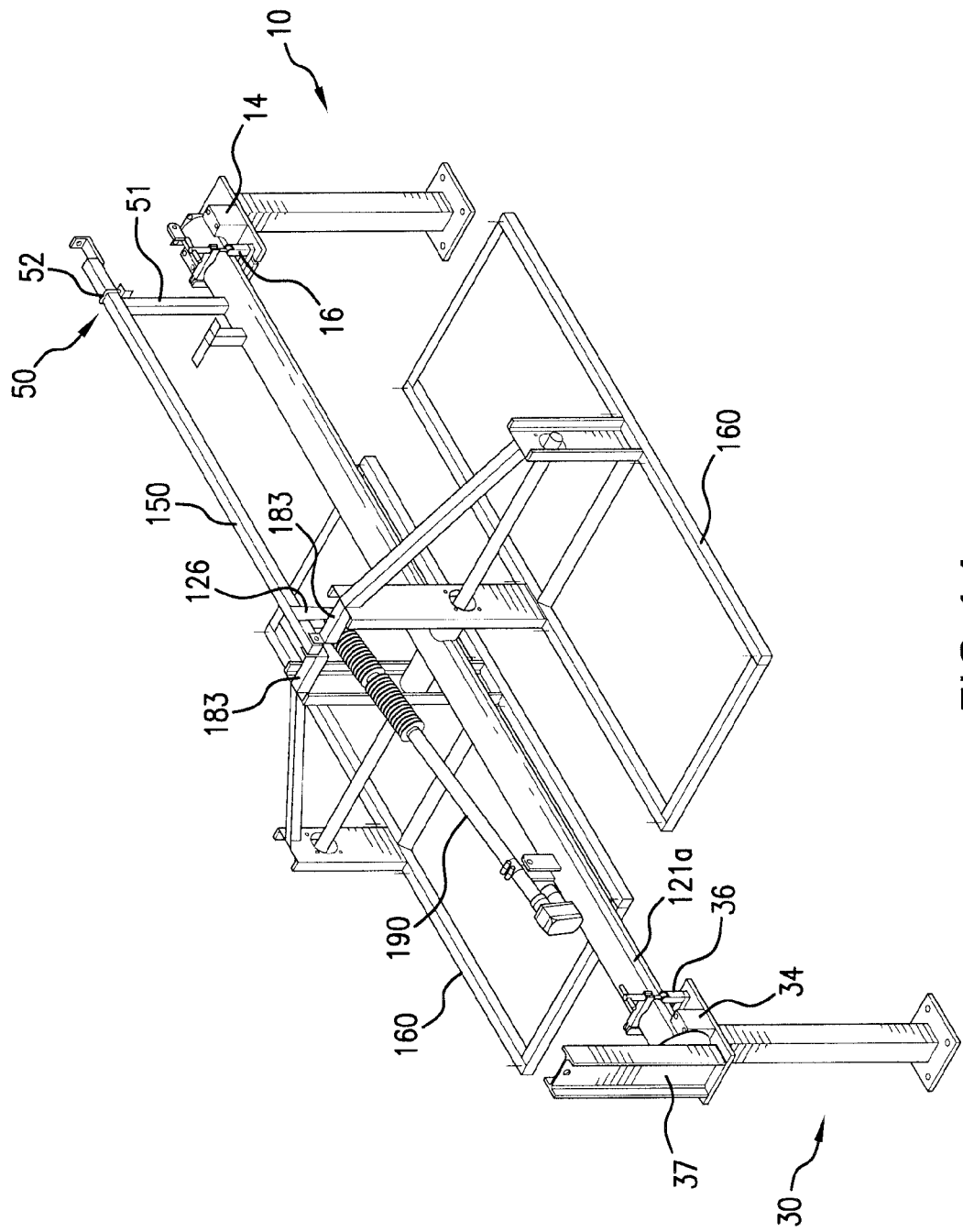
FIG. 14 is a perspective view of a first section secured to first and second alignment fixtures according to some embodiments of the present invention.

FIG. 14 illustrates assembly of a first section 121a of the torque tube 120 that includes the linear actuator 190. The first end of the section 121a is secured to the alignment fixture 10 by placement in the receptacle 14 and closing the clamp 16. The second end is secured to the alignment fixture 30 in a similar manner with placement in the receptacle 34 and closing the clamp 36. The mount 160 is attached to the section 121a in a similar manner as described above.

The linkage 150 is secured to the mount 160 with a fastener that extends through the linkage 150 and into opposing arms 183 on each side of the linkage 150. The linkage 150 is also supported during the assembly process by the support 50. The support 50 is attached to the linkage 150 by threading the eyelet 52 onto the linkage 150 and sliding the support 50 along the length to a distance away from the mount 160 to support the linkage 150. The leg 51 extending from the eyelet 52 abuts against the section 121a to support the linkage 140 away from the section 121a. The bottom of the leg 51 that abuts against the section 121a may include a shape that corresponds to the exterior shape of the section 121a to provide a more secure abutting contact. As illustrated in FIG. 14, the linkage 150 extends outward from a single side of the mount 160 and therefore is not attached to the extension 37 of the second alignment fixture 30.

The linear actuator 190 is attached with a first end secured to the section 121a, and a second end attached to the connector plate 126 on the linkage 150. As illustrated in FIG. 14, the arm 38 that extends outward from the second alignment fixture 30 is not necessary for assembling the first section 121a. The arm 38 may be removed from the second alignment fixture 30 as illustrated in FIG. 14. Alternatively, the arm 38 may remain attached to the second alignment fixture 30 and be pivoted out of the way during the assembly process. Once the section 121a is complete, the solar modules 115 may be attached to the mounts 160.

The order of assembly of the various components of the sections 121a, 121b may vary. According to some embodiments of the present invention, the solar modules 115 are attached to the mounts 160 after the linkages 150 and linear actuator 190 are attached to the sections 121. Other embodiments may attach the solar modules 115 prior to one or more of the other components.

Figure 15:
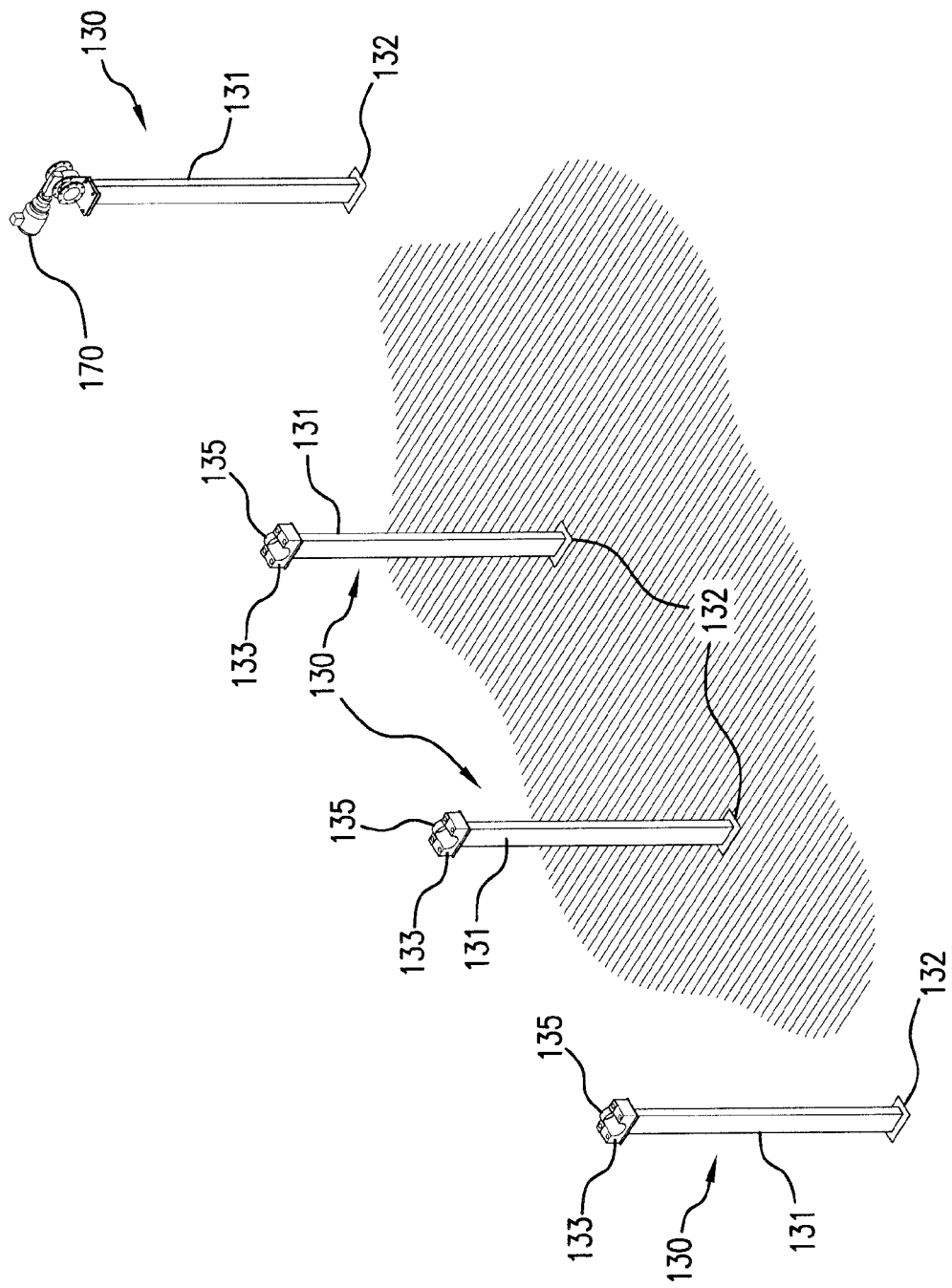
FIG. 15 is a perspective view of vertical supports mounted to a support according to some embodiments of the present invention.

FIG. 15 illustrates a first step of assembling a solar array 100. A number of vertical supports 130 are connected to the support surface 300. The vertical supports 130 are aligned in a straight row to receive the various sections 121 that will comprise the solar array 100. The vertical supports 130 may be aligned in a north-south arrangement as illustrated in FIG. 1. Receptacles 133 are mounted to the ends of some supports 130 and are configured to receive the sections 121 and allow for rotation about the axis A. According to some embodiments of the present invention, the receptacles 133 may include a scalloped groove that corresponds to the exterior shape of the sections 121 to allow for rotation. The receptacles 133 may also include securement devices 135 that extend over a top of the sections 121. The scalloped grooves may extend around a first portion of the sections 121 and the securement devices 135 may extend around a remainder to encircle the sections 121 and prevent inadvertent removal.

One of more drives 170 may be attached to the vertical supports 130. The drives 170 provide a rotational force to the sections 121 for rotating the torque tube 120 about the axis A. A variety of different drives 170 may be used for providing the rotational force.

Figure 16:
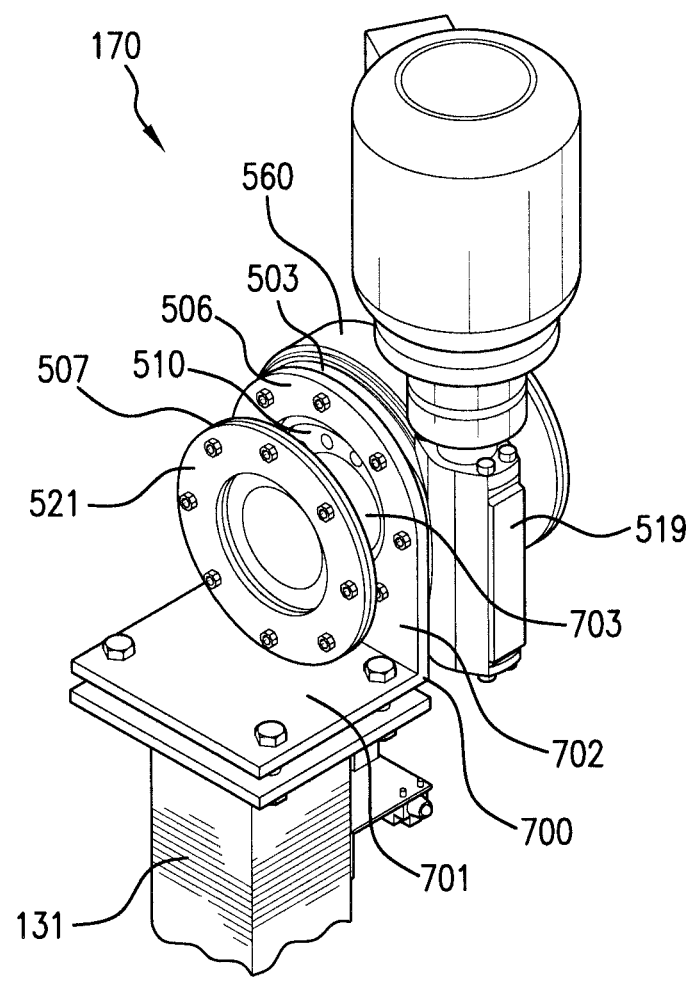
FIG. 16 is a perspective view of a drive for rotating the torque tube according to some embodiments of the present invention.

FIG. 16 includes an embodiment of a drive 170 that includes a slew speed reducer to rotate the sections 121 that comprise the torque tube 120. The drive 170 may deliver high torque and smooth rotational positioning to the torque tube 120 to accurately maintain the alignment of the solar modules 115 during the course of the day. The drive 170 may also rotate heavier and/or larger solar modules 115 and supporting frames 110 than other drives. The drive 170 may also include a reduced size that does not interfere with the movement of the other elements of the solar array 100.

The drive 170 includes an inner ring (not illustrated), a worm (not illustrated), and an annular outer gear ring 503. The inner ring and outer ring 503 are arranged in an embedded alignment and concentric about a common axis that may include the axis of the torque tube 120. The outer gear ring 503 has a central opening that receives the inner slew ring, and an outer surface with a plurality of teeth that mate with the worm. The outer gear ring 503 also includes lateral sides 506 that extend between the central opening and the outer surface. The worm includes a helical tooth that engages with the plurality of teeth on the outer gear ring 503. A housing 519 may extend around a portion or entirety of the worm for protection from debris or environmental elements (e.g., ice, rain, snow) to which the array 100 may be exposed. Likewise, a cover 560 may extend over the teeth of the outer annular gear ring 503.

The inner slew ring is connected to the sections 121 of the torque tube 120 by adapters 507. A first adapter 507 extends between the inner slew ring and a first section 121, and a second adapter 507 extends between the inner slew ring and a second section 121. The adapters 507 include a first plate 510 configured to connect to the inner slew ring, and a second plate 521 configured to attach to the flange 122 of the adjacent section 121. In some embodiments of the present invention, one or both sections 121 are connected directly to the inner slew ring (i.e., without an adapter 507).

A bracket 700 connects the drive 170 to a vertical support 130. The bracket 700 includes a first section 701 that connects to the vertical support 130, and a second section 702 that connects to the outer gear ring 503. Each of the sections 701, 702 may be substantially flat and perpendicular to each other. The bracket 700 may also include other configurations. The first section 701 may connect to the vertical support 130 by various mechanisms. The second section 702 includes a central aperture 703 that receives a section of the adaptor 507 and is sized to allow rotation of the adapter 507 relative to the bracket 700. Apertures in the second section 702 align with apertures in the outer gear ring 503 to receive fasteners to attach the bracket 507 to the outer gear ring 503. This connection prevents the outer gear ring 503 from rotating during operation of the drive 170. With the outer gear ring 503 stationary, the drive 170 allows the inner slew ring and worm to rotate with the torque tube 120 while tracking the movement of the sun. The amount of rotation of the worm about the outer gear ring 503 may vary depending upon the specifics of the array 100. In one embodiment, the worm rotates about 180° around the outer gear ring 503. The amount of angular range defining the rotation for the solar array 100 could be different depending on many factors such as, the geographical location of the solar array or the time of year, and could therefore be adjusted at anytime during the installation or operation of the solar tracking array.

A single drive 170 may be adequate to rotate the torque tube 120. Alternatively, two or more drive 170 may be positioned along the torque tube 120 to drive the various discrete sections 121 as necessary. In embodiments with multiple drives 170, the drives 170 may be the same or may be different. Embodiments of drives are disclosed in U.S. patent application Ser. No. 12/574,508 herein incorporated by reference in its entirety.

Figure 17:
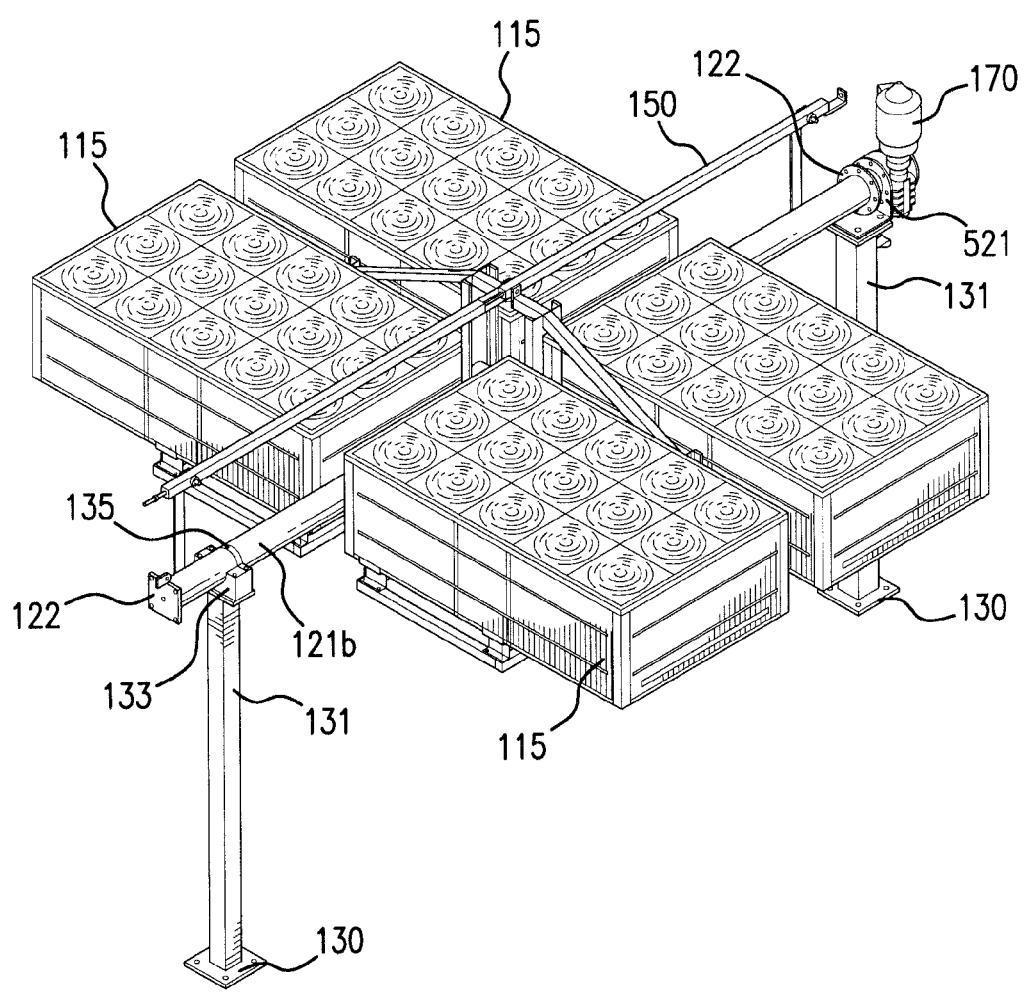
FIG. 17 is a perspective view of a second section assembled to vertical supports and a drive according to some embodiments of the present invention.

FIG. 17 illustrates an assembled second section 121b mounted to adjacent vertical supports 130. The section 121b is positioned with a first end in the first vertical support 130, and a second end within a receptacle 133 of a second vertical support 130. One or more intermediate vertical supports 130 (not illustrated) may also be positioned to support the section 121b. The first end is positioned to attach with the drive 170 mounted on the vertical support 130. According to some embodiments of the present invention, the section 121b is placed onto the vertical supports 130 and then aligned by sliding the section 121b on the vertical supports 130 with the flange 122 abutting against the second plate 521 of the drive 170. Fasteners extend through aligned apertures in the flange 122 and plate 521 to secure the section 121b to the drive 170. Securement devices 135 on the receptacles 133 may also be placed over the section 121b to further secure the section 121b to the vertical supports 130.

Figure 18:
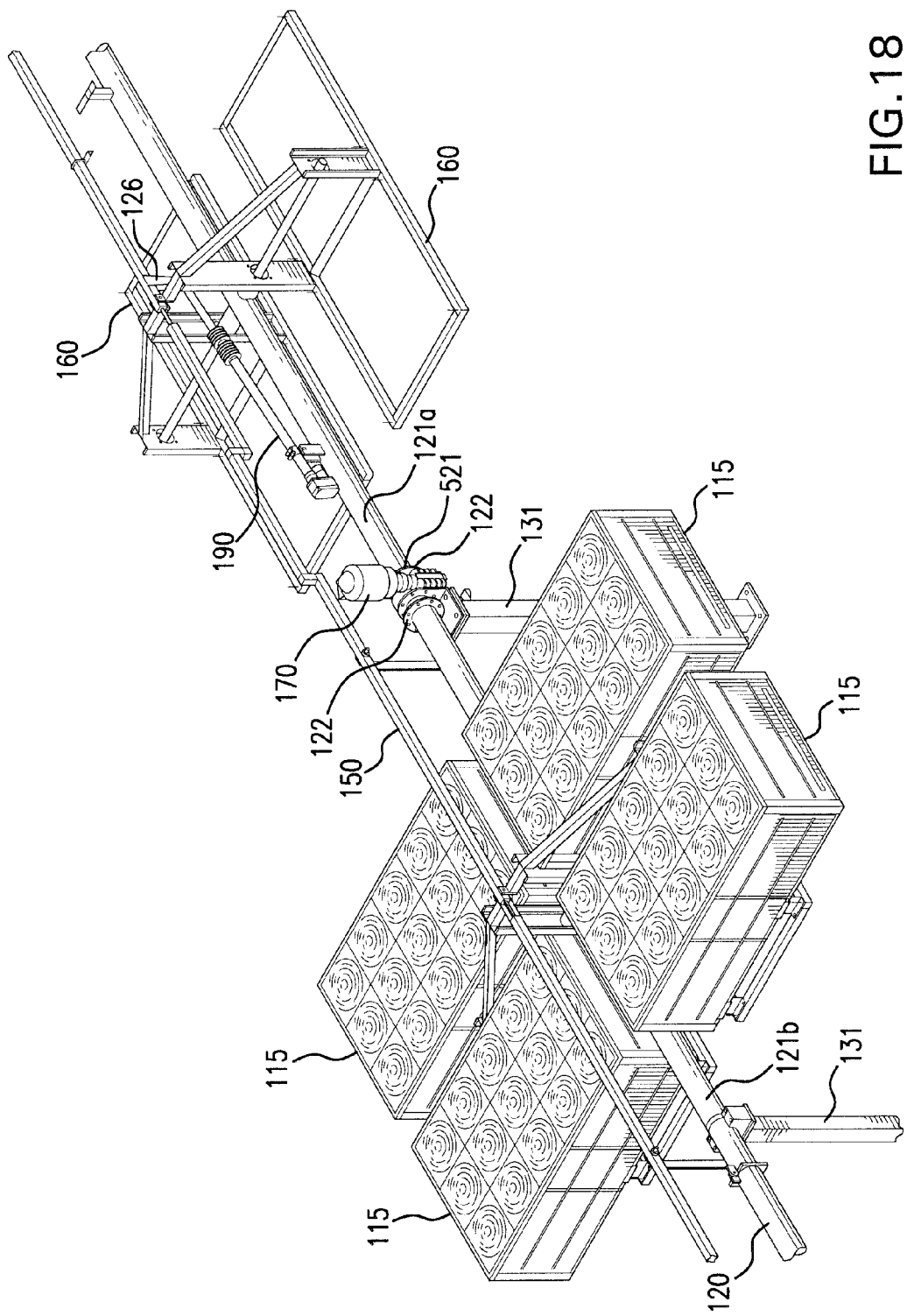
FIG. 18 is a perspective view of a first section assembled to a second section according to some embodiments of the present invention.

FIG. 18 illustrates another step of the assembly process with a first section 121a having a linear actuator 190 being attached to the second section 121b. The first section 121a is positioned on one or more vertical supports 130 with the flange 122 at one end slid into contact with a second plate 521 of the drive 170. The flange 122 is aligned with the second plate 521 and fasteners are inserted to attach the first section 121a to the drive 170. Securement devices 135 on the other vertical supports 130 may be placed over the section 121b to provide further attachment. The first section 121a is axially aligned and co-linear with the second section 121b. The sections 121a, 121b together form a portion or entirety of the torque tube 120 of the solar array 100.

The linkages 150 of the sections 121a, 121b are further attached together. The various sections of linkages 150 form a continuous member that is driven by the linear actuator 190.

Additional sections 121 may be attached to the ends of the torque tube 120 as necessary to meet the desired output demands. According to some embodiments of the present invention, the solar array 100 is assembled with the drive 170 positioned along a central section of the torque tube 120. This positioning provides for the drive 170 to apply an equal amount of torque to each half of torque tube 120. A single drive 170 may be adequate for providing rotational power to the torque tube 120. Alternatively, two or more drives 170 may provide the rotational power.

The linear actuator 190 may also be positioned along the central section of the torque tube 120. This positioning provides for the linear actuator 190 to apply an equal amount of force to sections of the linkages 150 that extend outward in each of the opposing directions.

According to some embodiments of the present invention, the solar array 100 is assembled from the center outward. Therefore, a first central section 121 is attached to the vertical supports 130. Afterwards, additional sections 121 are attached to each of the ends of the first central section 121.

According to some embodiments of the present invention, the first central section 121 is attached to the drive 170 and/or the linear actuator 190.

According to some embodiments of the present invention, the solar modules 115 are attached to the section 121 while it is still secured in the alignment fixtures 10, 30. Other embodiments attach the solar modules 115 at different times. FIG. 18 illustrates an assembly embodiment in which the solar modules 115 are attached to the section 121a after the section 121a is attached to another section 121b of the solar array 100.

In one embodiment, the solar array 100 is assembled at the installation site. The various components are sized to fit within a standard vehicle and are light-weight to allow installation by a single person or limited number of persons. Further, the modular aspect of the array 100 facilitates modifications after the initial installation. Additional sections 121 and vertical supports 130 may be added to the frame 110 to accommodate a desired number of additional solar modules 115. Further, the size of the array 100 may be reduced after installation by removing one or more solar cell modules 115.

The frame 110, torque tube 120, vertical supports 130, mounts 160, and solar modules 150 may include various configurations. U.S. patent application Ser. Nos. 12/623,134, 12/574,508, 12/478,567, and 12/257,670 disclose various configurations of these components and are herein incorporated by reference in their entireties.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

Without further analysis, from the foregoing others can, by applying current knowledge, readily adapt the present invention for various applications. Such adaptations should and are intended to be comprehended within the meaning and range of equivalence of the following claims.

What is claimed is:

1. A method of assembling a terrestrial solar tracking photovoltaic array that includes a plurality of vertical supports that support a longitudinal support comprising a string of coaxial torque tubes mounted thereon over the surface of the earth and substantially in a north-south direction, said longitudinal support being journalled for rotation so as to allow rotation during the course of a day, the method comprising:
   positioning a torque tube on two vertical supporting alignment fixtures, the torque tube including a first end and a second end;
   mounting a mount to the torque tube between the first and second ends, the mount having first and second sections that extend outward from opposing sides of the torque tube;
   mounting a first solar cell module to the first section of the mount and a second solar cell module to the second section of the mount, each of the solar cell modules including an array of lenses positioned over a set of corresponding receivers that include one or more III-V compound semiconductor solar cells;
   after the solar cell modules are mounted to the mount, removing the torque tube from the alignment fixtures;
   aligning the torque tube with a longitudinal support that is mounted over the surface of the earth with the torque tube and the longitudinal support being coaxial and aligned in an end-to-end orientation; and
   attaching the torque tube to the end of the longitudinal support and forming a single continuous member with the first and second solar cell modules being rotatable about a first axis defined by the coaxial torque tube and the longitudinal support and a second axis substantially perpendicular to the first axis.

2. The method of claim 1, further comprising mounting the first solar cell module on a first side of the torque tube and the second solar cell module on an opposing second side of the torque tube, the first and second solar cell modules being positioned about 180° apart.

3. The method of claim 1, further comprising abutting a first flange on the first end of the torque tube against a second flange on the end of the longitudinal support and inserting fasteners through the first and second flanges to attach the first end of the torque tube to the end of the longitudinal support.

4. The method of claim 1, wherein positioning the torque tube on the two vertical supporting alignment fixtures includes positioning the torque tube in a scalloped receptacle mounted to a first of the two vertical alignment fixtures with the receptacle having a shape that conforms to an exterior shape of the torque tube.

5. The method of claim 4, further comprising encircling the torque tube by moving an arm on the first vertical alignment fixture over the torque tube after the torque tube is placed in the scalloped receptacle.

6. The method of claim 1, further comprising prior to removing the torque tube from the two vertical alignment fixtures, attaching a first end of an elongated linkage to an extension that extends outward from one of the two vertical alignment fixtures and a attaching a central section of the linkage to the mount, the linkage being parallel with the torque tube.

7. The method of claim 1, further comprising attaching a linear actuator to the torque tube with a first end of the linear actuator attached to an intermediate section of the torque tube between the first and second ends and a second end of the linear actuator attached to a linkage that extends parallel to the torque tube.

8. A method of assembling a terrestrial solar tracking photovoltaic array that includes a plurality of vertical supports that support a longitudinal support comprising a string of coaxial torque tubes mounted thereon over the surface of the earth and substantially in a north-south direction, said longitudinal support being journalled for rotation so as to allow rotation during the course of a day, the method comprising:
   securing a torque tube to an alignment fixture by positioning a flange at an end of the torque tube over a shelf on the alignment fixture and positioning a section of the torque tube inward from the flange into a receptacle on the shelf of the alignment fixture;
   aligning and mounting a mount to the torque tube at a point along the torque tube inward from the end of the torque tube;
   aligning and mounting a solar cell module to the mount with the solar cell module including an array of lenses positioned over a set of corresponding receivers that include one or more III-V compound semiconductor solar cells;
   after the solar cell module is mounted to the mount, removing the torque tube from the alignment fixture; and
   aligning and mounting the torque tube to an end of the longitudinal support with the torque tube being coaxial with the longitudinal support and the solar cell module being able to rotate with the torque tube about a first axis that extends through the torque tube and the longitudinal support and a second axis perpendicular to the first axis.

9. The method of claim 8, further comprising positioning the torque tube onto ends of a plurality of vertical supports and subsequently aligning and mounting the torque tube to the end of the longitudinal support.

10. The method of claim 9, further comprising attaching the flange at the end of the torque tube to a ring member of a drive positioned at the end of one of the plurality of vertical supports, the drive providing a rotational force to the torque tube and the longitudinal support to rotate both about the first axis.

11. The method of claim 10, further comprising mounting the drive to the end of one of the plurality of vertical supports prior to attaching the flange at the end of the torque tube to the drive.

12. The method of claim 8, wherein securing the torque tube to the alignment fixture further comprises positioning a bottom side of the torque tube into a scalloped groove on the alignment fixture and positioning a clamp arm mounted to the alignment fixture over a top side of the torque tube, the clamp arm maintaining the torque tube in the scalloped groove.

13. The method of claim 8, wherein mounting the mount to the torque tube at the point along the torque tube inward from the end of the torque tube comprises positioning the mount at an end of an alignment arm that is attached to and extends outward from the alignment fixture.

14. The method of claim 8, further comprising mounting an elongated linkage to the torque tube with the linkage being parallel to the first axis while the torque tube is secured to the alignment fixture.

15. The method of claim 13, further comprising attaching a linear actuator with a first end of the linear actuator attached to the torque tube and a second end of the linear actuator attached to the linkage, the linear actuator including a drive and telescoping first and second sections with the first end positioned on the first section and the second end positioned on the second section.

16. The method of claim 14, further comprising supporting the linkage while the torque tube is secured to the alignment fixture by positioning the linkage in a receiver on a first end of a support and contacting a second end of the support against the torque tube, the support including a length to position the linkage parallel to the first axis.

17. A method of assembling a terrestrial solar tracking photovoltaic array comprising:
   securing a first torque tube section to first and second alignment fixtures;
   while the first torque tube section is secured, mounting a first mount to the first torque tube section and a first linkage to the first mount;
   removing the first torque tube section from the first and second alignment fixtures;
   thereafter, securing a second torque tube section to the first and second alignment fixtures;
   while the second torque tube section is secured, mounting a second mount to the second torque tube section and a second linkage to the second mount;
   removing the second torque tube section from the first and second alignment fixtures;
   rotatably securing the first torque tube section on a first plurality of vertical supports;
   rotatably securing the second torque tube section on a second plurality of vertical supports;
   aligning and mounting the second torque tube section to an end of the first torque tube section with the sections being arranged in coaxial end-to-end arrangement;
   attaching the first and second linkages together;
   attaching solar cell modules to each of the first and second mounts with the solar cell modules including an array of lenses positioned over a set of corresponding receivers that include one or more III-V compound semiconductor solar cells;
   attaching the first torque tube section to a drive to rotate the first and second torque tube sections about a first axis that extends through the first and second torque tube section; and
   attaching one of the first and second linkages to a linear actuator to rotate the first and second mounts about a second axis perpendicular to the first axis.

18. The method of claim 17, wherein attaching the solar cell modules to each of the first and second mounts occurs while the first and second torque tube sections are secured to the first and second alignment fixtures.

19. The method of claim 17, wherein securing the first and second torque tube sections to the first and second alignment fixtures includes placing ends of the torque tube sections into receptacles on the first and second alignment fixtures.

20. The method of claim 17, further comprising mounting an equal number of the solar cell modules on each side of the first and second torque tube sections to distribute the weight and facilitate rotation about the first axis.

* * * * *